(12) United States Patent
Okamoto

(10) Patent No.: US 9,804,474 B2
(45) Date of Patent: Oct. 31, 2017

(54) LIGHT MODULATOR, OPTICAL MODULE, AND IMAGE DISPLAY APPARATUS

(71) Applicant: Seiko Epson Corporation, Tokyo (JP)

(72) Inventor: Junichi Okamoto, Fujimi (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/239,012

(22) Filed: Aug. 17, 2016

(65) Prior Publication Data
US 2017/0052423 A1 Feb. 23, 2017

(30) Foreign Application Priority Data

Aug. 21, 2015 (JP) ................. 2015-164089

(51) Int. Cl.
| | |
|---|---|
| G02F 1/035 | (2006.01) |
| G02F 1/225 | (2006.01) |
| G02F 1/01 | (2006.01) |
| G02B 27/01 | (2006.01) |
| G02B 26/10 | (2006.01) |
| G02F 1/21 | (2006.01) |

(52) U.S. Cl.
CPC .......... *G02F 1/225* (2013.01); *G02B 26/101* (2013.01); *G02B 27/0101* (2013.01); *G02B 27/0172* (2013.01); *G02F 1/011* (2013.01); *G02B 2027/0178* (2013.01); *G02F 2001/212* (2013.01)

(58) Field of Classification Search
CPC ............................... G02F 2001/212
See application file for complete search history.

(56) References Cited

U.S. PATENT DOCUMENTS

| | | | | |
|---|---|---|---|---|
| 5,488,677 A | * | 1/1996 | Tokano | G01R 29/0885 250/227.11 |
| 5,832,155 A | * | 11/1998 | Rasch | G02B 6/12004 385/14 |
| 6,339,660 B1 | | 1/2002 | Buchmann et al. | |
| 7,228,019 B2 | * | 6/2007 | Takahashi | G02F 1/225 385/14 |

(Continued)

FOREIGN PATENT DOCUMENTS

| | | |
|---|---|---|
| JP | 2000-111853 A | 4/2000 |
| JP | 2006-184663 A | 7/2006 |

(Continued)

*Primary Examiner* — Michelle R Connelly
(74) *Attorney, Agent, or Firm* — Harness, Dickey & Pierce, P.L.C.

(57) ABSTRACT

A light modulator includes a substrate providing an electro-optical effect and provided with first to third optical waveguides, a first modulation section that modulates a blue light flux passing through the first optical waveguide, a second modulation section that modulates a green light flux passing through the second optical waveguide, and a third modulation section that modulates a red light flux passing through the third optical waveguide, and L1<L2<L3 and S1>S2>S3 are satisfied, where L1 represents the length of the first modulation section, S1 represents the distance between a first reference line and a first exit section, L2 represents the length of the second modulation section, S2 represents the distance between a second reference line and a second exit section, L3 represents the length of the third modulation section, and S3 represents the distance between a third reference line and a third exit section.

20 Claims, 12 Drawing Sheets

(56) References Cited

U.S. PATENT DOCUMENTS

| | | | |
|---|---|---|---|
| 2006/0138239 A1 | 6/2006 | Sonoda et al. | |
| 2010/0316236 A1* | 12/2010 | Snider | H04R 7/045 |
| | | | 381/152 |
| 2015/0378151 A1* | 12/2015 | Nishioka | G02B 26/101 |
| | | | 359/204.4 |
| 2016/0091772 A1* | 3/2016 | Okamoto | G02F 1/225 |
| | | | 345/7 |
| 2016/0094818 A1* | 3/2016 | Okamoto | G02B 26/123 |
| | | | 348/196 |
| 2017/0052394 A1* | 2/2017 | Goodwill | G02F 1/011 |
| 2017/0115546 A1* | 4/2017 | Doi | G02F 1/2257 |
| 2017/0146886 A1* | 5/2017 | Saito | G02F 1/2255 |

FOREIGN PATENT DOCUMENTS

| | | |
|---|---|---|
| JP | 2007-047534 A | 2/2007 |
| JP | 2016-071231 A | 5/2016 |
| JP | 2016-071259 A | 5/2016 |
| JP | 2016-071260 A | 5/2016 |

* cited by examiner

LIGHT MODULATOR, OPTICAL MODULE, AND IMAGE DISPLAY APPARATUS

BACKGROUND

1. Technical Field

The present invention relates to a light modulator, an optical module, and an image display apparatus.

2. Related Art

As a display apparatus that directly irradiates the retina of a pupil with laser light to allow a user to visually recognize an image, a head mounted display (HMD) and a head-up display (HUD) are known.

Such a display typically includes a light emitting device that emits light and a sweeper that changes the optical path in such a way that the emitted light sweeps the user's retina. The thus configured display allows the user to visually recognize, for example, both an outside scene and an image drawn by the sweeper at the same time.

For example, JP-A-2006-184663 discloses a light beam sweeping display including light sources that emit laser beams of the three primary colors and a deflector that sweeps and projects the laser beams on a screen or any other surface. JP-A-2006-184663 further discloses that the laser beams are deflected in the horizontal and vertical directions for raster sweeping to draw two-dimensional video images.

JP-A-2006-184663 still further discloses that the laser beams are directly modulated by control of the output from each of the light sources on the basis of image data.

In the configuration described in JP-A-2006-184663, in which the laser beams are directly modulated in the light sources, the wavelength of each of the laser beams unintentionally changes in some cases when the ambient temperature and other environmental factors change (wavelength shift). In this case, a shift of the color tone of drawn video images undesirably occurs.

In a case where a diffraction grating is present on the optical path of the light beam sweeping display, the wavelength shift causes a shift of the diffraction angle, resulting in a decrease in the resolution of drawn video images.

To address the problem, a proposal to suppress the wavelength shift by using an external modulator has been made. An example of the external modulator may include a modulator that includes a substrate in which optical waveguides are formed in parallel to each other and modulates the intensity of light passing through each of the optical waveguides by using an electro-optical effect.

Narrowing the gap between the optical waveguides parallel to each other in the external modulator allows the gap between light fluxes that exit out of the optical waveguides to be narrowed, whereby the resolution of video images to be drawn can be increased.

On the other hand, narrowing the gap between the optical waveguides parallel to each other too much results in crosstalk or optical bond between the optical waveguides, resulting in light loss and color shift.

Further, since the external modulator needs to be provided separately from the light sources, reduction in size of the external modulator is required.

SUMMARY

An advantage of some aspects of the invention is to provide a light modulator that allows a small distance between light fluxes that exit out of the light modulator and a small amount of light loss and further provide an optical module and an image display apparatus including the light modulator.

A light modulator according to an aspect of the invention includes a substrate providing an electro-optical effect. The substrate is provided with a first optical waveguide that a first light flux enters and a second optical waveguide that a second light flux having a wavelength longer than a wavelength of the first light flux enters. The first optical waveguide includes a first modulation section that modulates intensity of the first light flux, a first exit section that allows the first light flux to exit out of the first optical waveguide, and a first linkage section that links the first modulation section with the first exit section. The second optical waveguide includes a second modulation section that modulates intensity of the second light flux, a second exit section that allows the second light flux to exit out of the second optical waveguide, and a second linkage section that links the second modulation section with the second exit section. $L1<L2$ and $S1>S2$ are satisfied, where $L1$ represents a length of the first modulation section in a longitudinal direction thereof, an imaginary straight line parallel to the longitudinal direction of the first modulation section and passing through a portion where the first modulation section is connected to the first linkage section is defined as a first line, and $S1$ represents a distance between the first line and the first exit section, $L2$ represents a length of the second modulation section in a direction parallel to the first line, and an imaginary straight line parallel to the first line and passing through a portion where the second modulation section is connected to the second linkage section is defined as a second line, and $S2$ represents a distance between the second line and the second exit section.

A light modulator that allows a small distance between light fluxes that exit out of the light modulator and a small amount of light loss can therefore be provided. Further, reduction in size of the light modulator is readily achieved.

In the light modulator according to the aspect of the invention, it is preferable that the substrate includes a third optical waveguide that a third light flux having a wavelength longer than the wavelength of the second light flux enters, and that the optical waveguides are provided in an order of the first optical waveguide, the second optical waveguide, and the third optical waveguide.

With this configuration, when light fluxes of three colors, for example, a red light flux, a green light flux, and a blue light flux, enter the modulator, the modulator can modulate the light fluxes independently of one another, whereby an image display apparatus capable of displaying a multicolor image, for example, a full-color image, can be achieved by using the light modulator.

In the light modulator according to the aspect of the invention, it is preferable that the third optical waveguide includes a third modulation section that modulates intensity of the third light flux, a third exit section that allows the third light flux to exit out of the third optical waveguide, and a third linkage section that links the third modulation section with the third exit section, and that $L1<L2<L3$ and $S1>S2>S3$ are satisfied, where $L3$ represents a length of the third modulation section in the direction parallel to the first line, and an imaginary straight line parallel to the first line and passing through a portion where the third modulation section is connected to the third linkage section is defined as a third line, and $S3$ represents a distance between the third line and the third exit section.

With this configuration, when light fluxes of three colors, for example, a red light flux, a green light flux, and a blue light flux, enter the modulator, the modulator can modulate the light fluxes independently of one another with a small amount of light loss and reduce in size, whereby a compact image display apparatus capable of displaying a multicolor image, for example, a full-color image with a high resolution, can be achieved by using the light modulator.

In the light modulator according to the aspect of the invention, in a plan view in a thickness direction of the substrate, it is preferable that the first exit section is located in a position shifted from the first line toward the third line, the second exit section is located in a position shifted from the second line toward the third line, and the third exit section is located in a position shifted from the third line toward the first line.

The bend radii of the first, second, and third linkage sections can therefore be particularly large with the size of the modulator further reduced or an increase in the size of the modulator suppressed, whereby the amount of light loss can be reduced.

In the light modulator according to the aspect of the invention, it is preferable that, when a portion of the first optical waveguide where the first light flux enters the first optical waveguide is defined as a first entrance section, and a portion of the second optical waveguide where the second light flux enters the second optical waveguide is defined as a second entrance section, a distance between the first exit section and the second exit section is smaller than a distance between the first entrance section and the second entrance section.

The distance between the first exit section and the second exit section can therefore be shortened while the distance between the first entrance section and the second entrance section is ensured to some extent in consideration of the size of light sources. As a result, for example, when the light modulator is used in an image display apparatus, not only is the resolution of a displayed image increased, but also the light sources are readily arranged (optical system is readily designed).

In the light modulator according to the aspect of the invention, it is preferable that an optical axis of the light flux that exits through the first exit section is parallel to an optical axis of the light flux that exits through the second exit section.

With this configuration, when the light flux having exited through the first exit section and the light flux having exited through the second exit section are swept with a light scanner for image drawing, a problem with the optical system, for example, the light fluxes do not reach the light scanner, or a problem of a decrease in the resolution of a drawn image will not occur.

In the light modulator according to the aspect of the invention, it is preferable that the first optical waveguide includes a first primary line and a first bifurcation section that bifurcates the first primary line into at least two branch lines, a first branch line and a second branch line, that the first modulation section includes a first branch line modulation section that modulates the intensity of the first light flux passing through the first branch line and a second branch line modulation section that modulates the intensity of the first light flux passing through the second branch line, that the first exit section includes a first branch line exit section that allows the first light flux passing through the first branch line to exit out of the first branch line and a second branch line exit section that allows the first light flux passing through the second branch line to exit out of the second branch line, and that the first linkage section includes a first branch line linkage section that links the first branch line modulation section with the first branch line exit section and a second branch line linkage section that links the second branch line modulation section with the second branch line exit section.

The first light flux can therefore be distributed to two optical waveguides and allowed to exit in the form of two light fluxes. Therefore, for example, when the optical scanner sweeps the light flux having exited through the first branch line exit section and the light flux having exited through the second branch line exit section to draw an image, the number of sweep lines can be increased as compared with a case where the number of light fluxes is one without any increase in the frequency at which the light scanner is driven. A high-resolution image display apparatus can therefore be readily achieved.

In the light modulator according to the aspect of the invention, it is preferable that the second optical waveguide includes a second primary line and a second bifurcation section that bifurcates the second primary line into at least two branch lines, a third branch line and a fourth branch line, that the second modulation section includes a third branch line modulation section that modulates the intensity of the second light flux passing through the third branch line and a fourth branch line modulation section that modulates the intensity of the second light flux passing through the fourth branch line, that the second exit section includes a third branch line exit section that allows the second light flux passing through the third branch line to exit out of the third branch line and a fourth branch line exit section that allows the second light flux passing through the fourth branch line to exit out of the fourth branch line, and that the second linkage section includes a third branch line linkage section that links the third branch line modulation section with the third branch line exit section and a fourth branch line linkage section that links the fourth branch line modulation section with the fourth branch line exit section.

The second light flux can therefore be distributed to two optical waveguides and allowed to exit in the form of two light fluxes. Therefore, for example, when the optical scanner sweeps the light flux having exited through the third branch line exit section and the light flux having exited through the fourth branch line exit section to draw an image, the number of sweep lines can be increased as compared with the case where the number of light fluxes is one without any increase in the frequency at which the light scanner is driven. A high-resolution image display apparatus can therefore be readily achieved.

In the light modulator according to the aspect of the invention, it is preferable that the first modulation section uses a Mach-Zehnder-type modulation method.

With this configuration, the light modulator can be achieved in a relatively simple structure, and the light modulation width can be readily adjusted.

An optical module according to another aspect of the invention includes a light source section that outputs the first light flux and the second light flux, and the light modulator according to the aspect of the invention.

An optical module that includes the light modulator that allows a small distance between light fluxes that exit out of the light modulator and a small amount of light loss and is capable of stably outputting light fluxes modulated at high speed can therefore be provided.

An image display apparatus according to another aspect of the invention includes a light source section that outputs the first light flux and the second light flux, the light modulator according to the aspect of the invention, and a light scanner that spatially sweeps the first light flux and the second light flux modulated by the light modulator.

An image display apparatus that includes the light modulator that allows a small distance between light fluxes that exit out of the light modulator and a small amount of light loss and is capable of displaying a high-resolution image can therefore be provided. Further, reduction in size of the image display apparatus is readily achieved.

It is preferable that the image display apparatus according to the aspect of the invention is a head mounted display attached to a user's head.

A head mounted display that is capable of displaying a high-resolution image and is compact can therefore be provided.

It is preferable that the image display apparatus according to the aspect of the invention is a head-up display.

A head-up display that is capable of displaying a high-resolution image and is compact can therefore be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

A light modulator, an optical module, and an image display apparatus according to preferable embodiments of the invention will be described below in detail with reference to the accompanying drawings.

Image Display Apparatus

First Embodiment

An image display apparatus according to a first embodiment will first be described.

Figure 1:
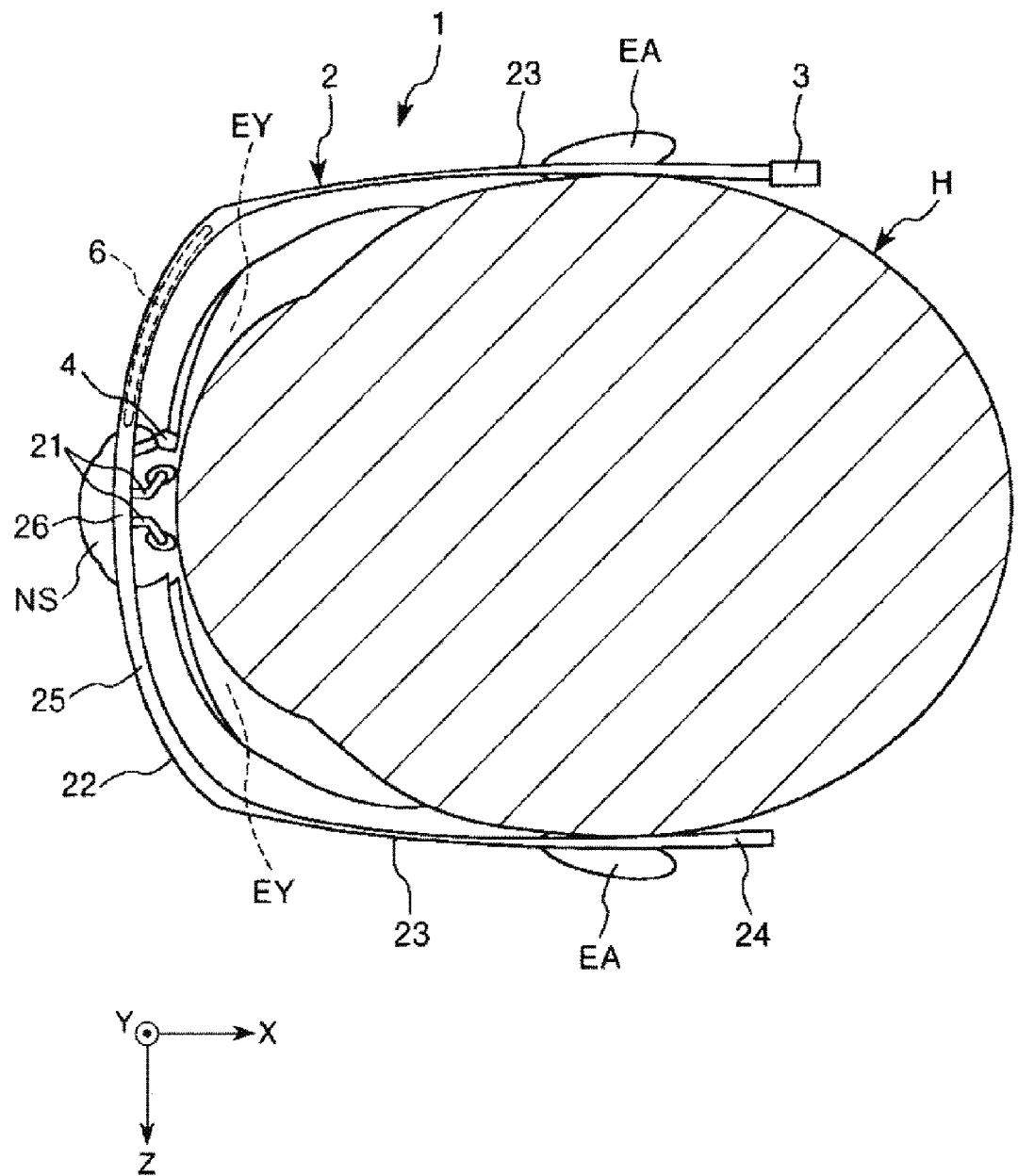
FIG. 1 shows a schematic configuration of an image display apparatus (head mounted display) according to a first embodiment.
Figure 2:
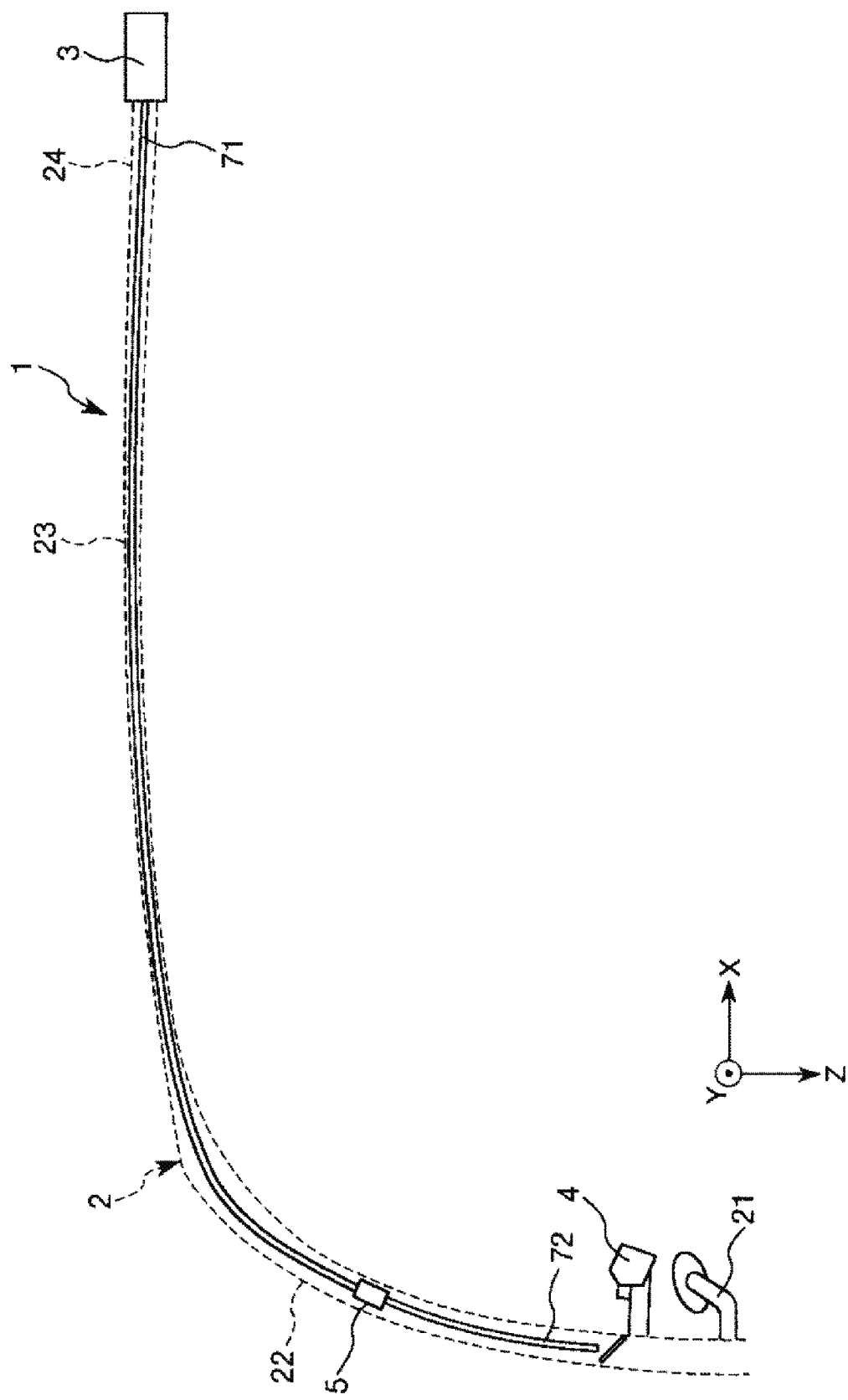
FIG. 2 is a partial enlarged view of the image display apparatus shown in FIG. 1.
Figure 3:
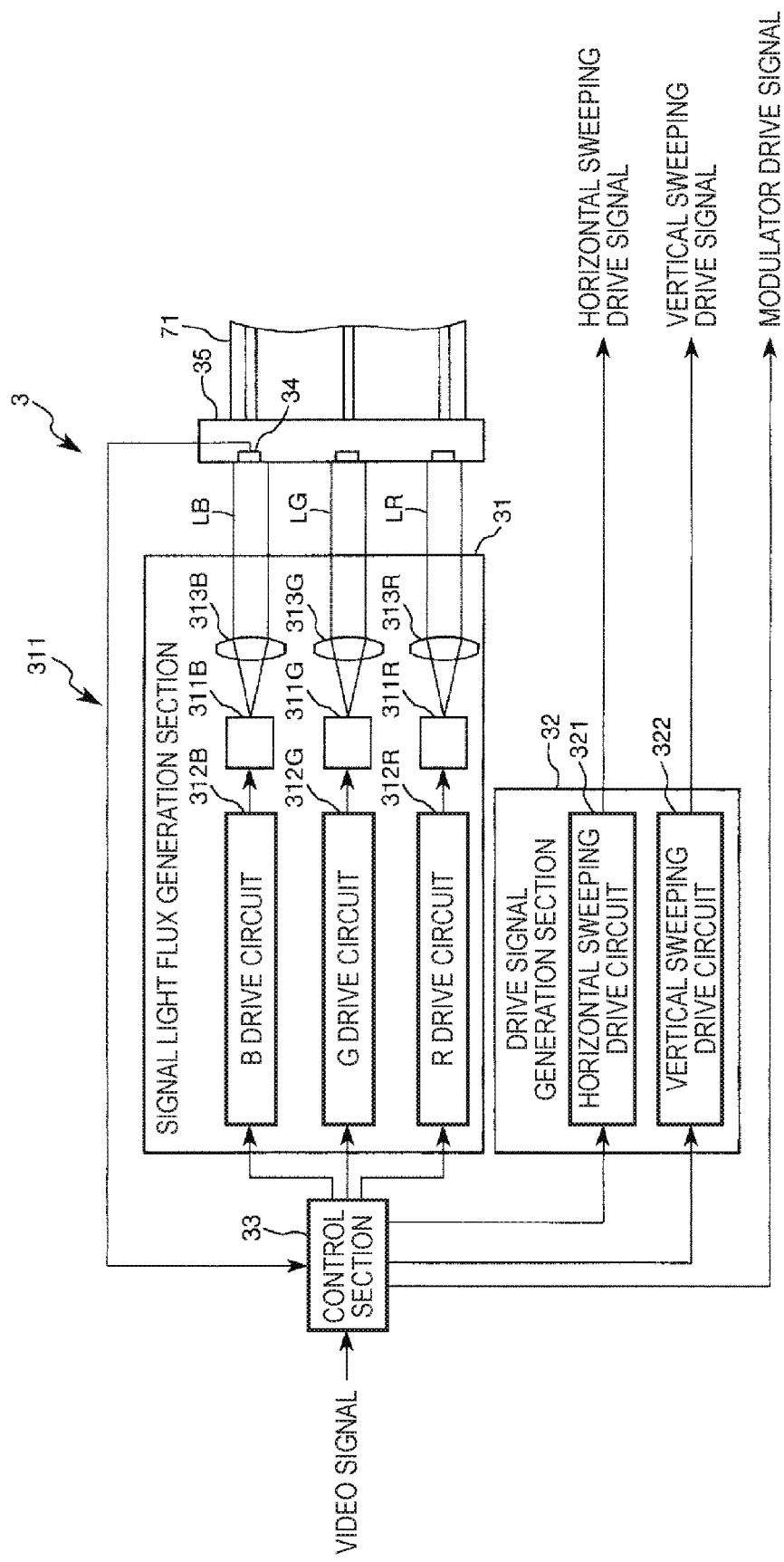
FIG. 3 is a schematic configuration diagram of a signal generator of the image display apparatus shown in FIG. 1.
Figure 4:
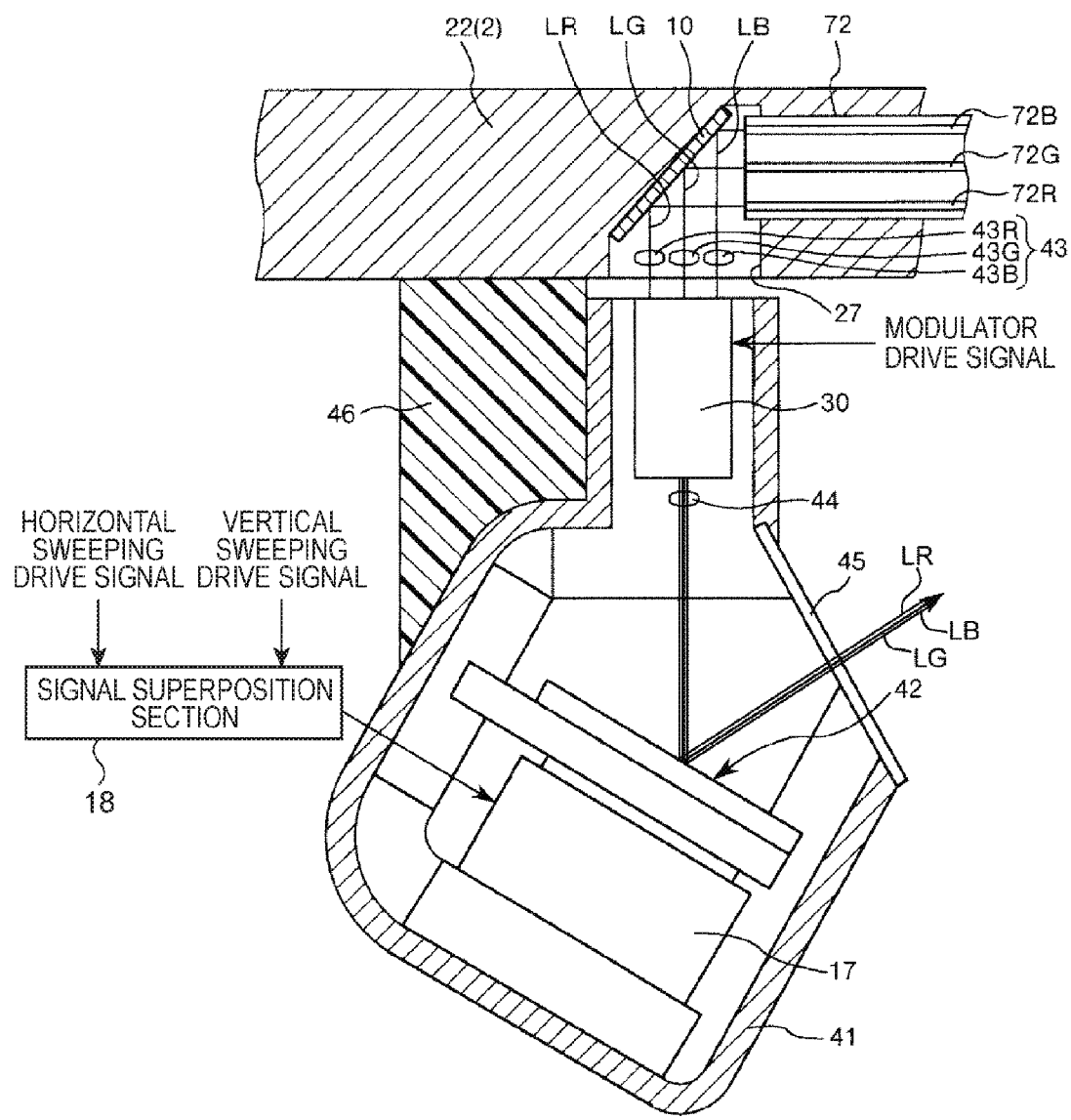
FIG. 4 shows a schematic configuration of a light sweeper provided in a swept light output section shown in FIG. 1.
Figure 5:
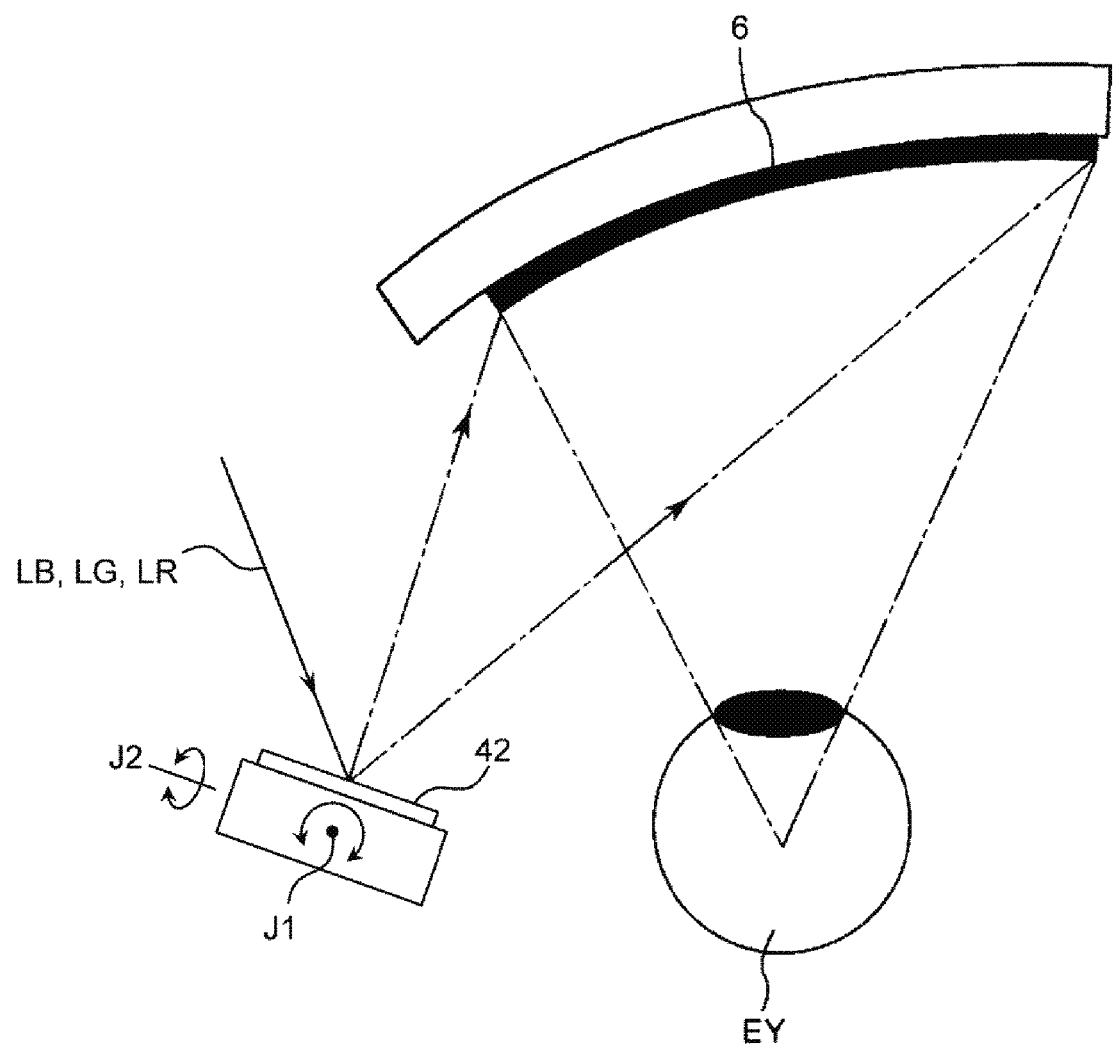
FIG. 5 diagrammatically describes an effect of the image display apparatus shown in FIG. 1.
Figure 6:
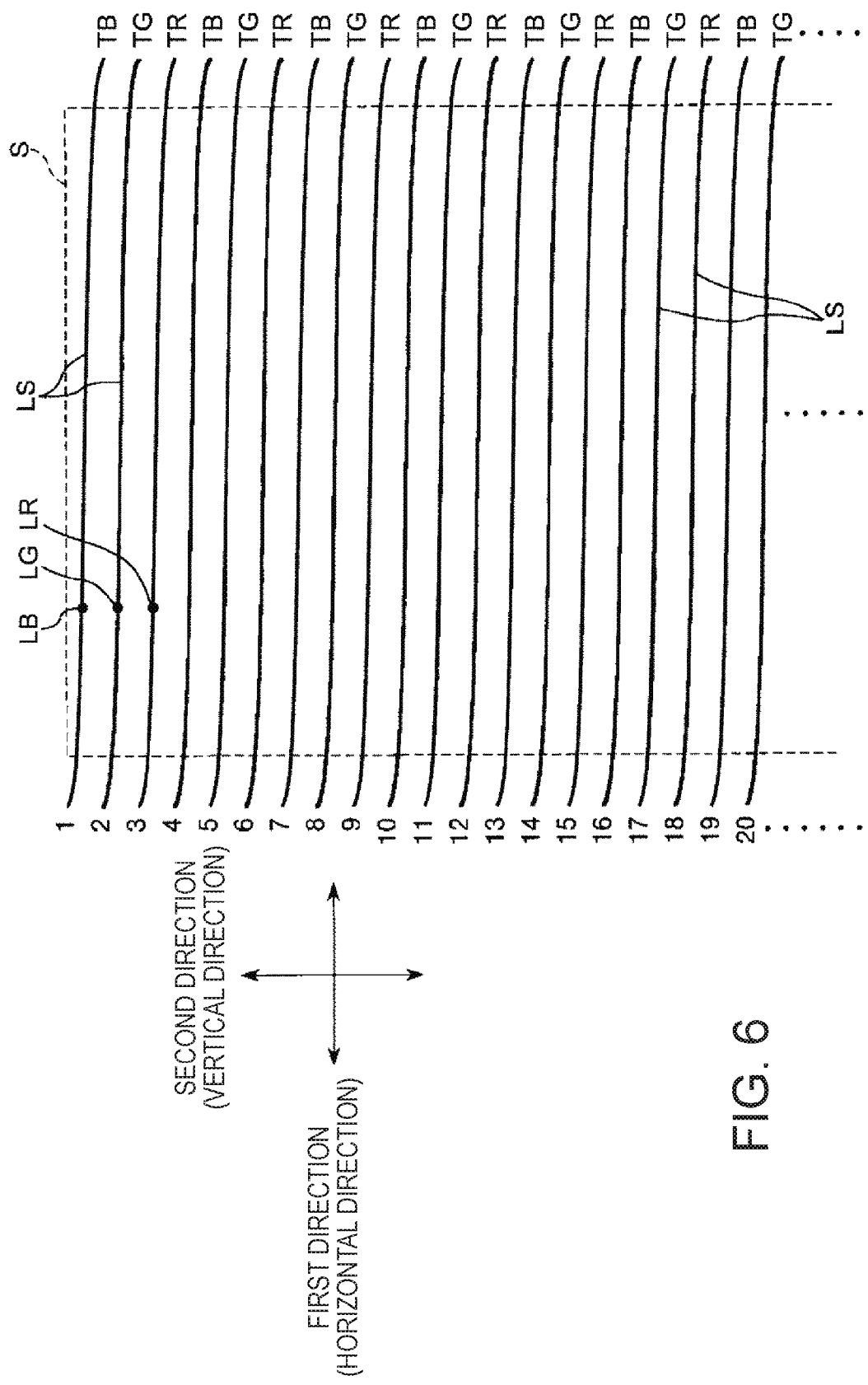
FIG. 6 shows the trajectories of swept signal light fluxes in an image formation plane according to the first embodiment.
Figure 7:
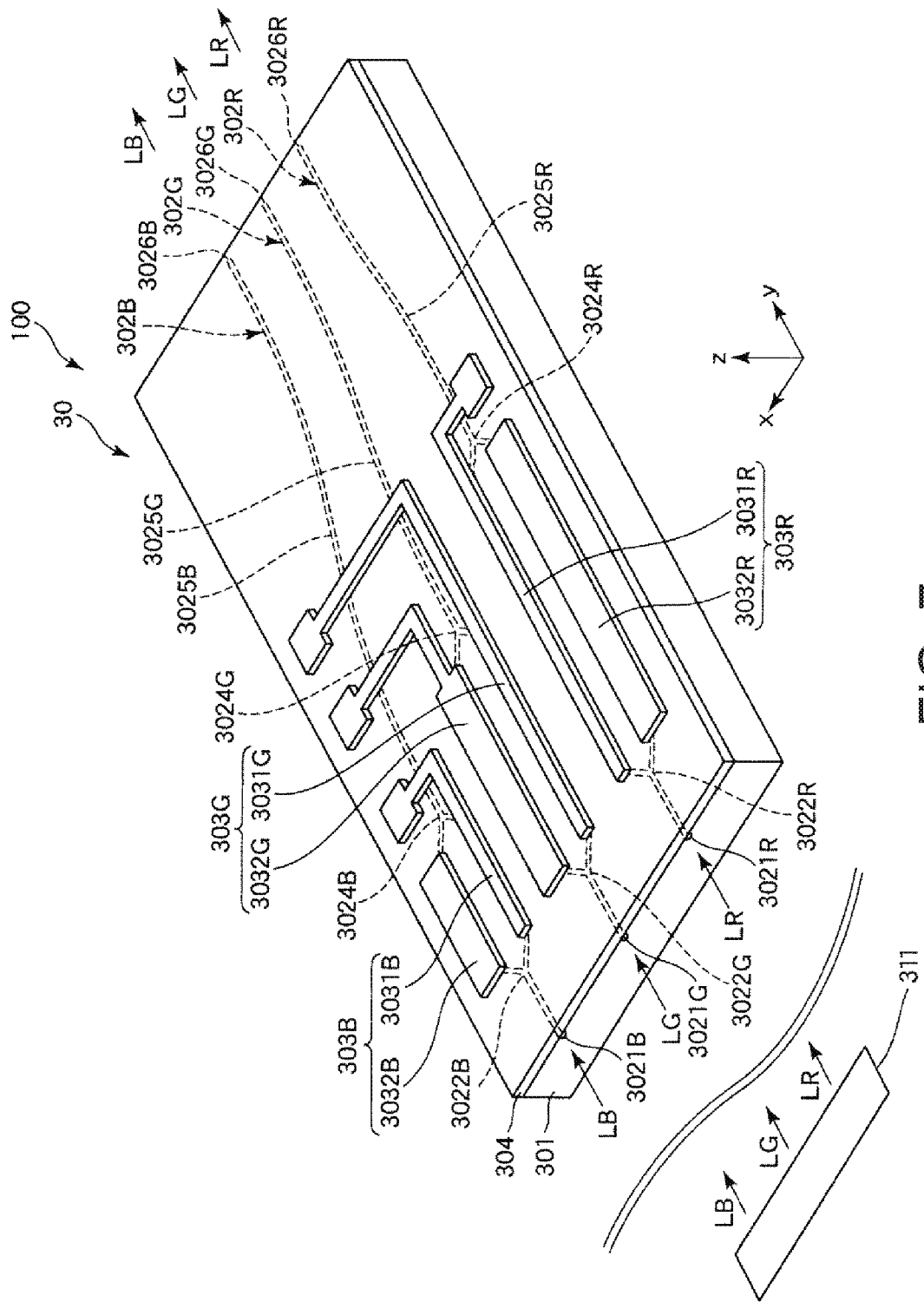
FIG. 7 is a perspective view showing a schematic configuration of a modulator shown in FIG. 4.
Figure 8:
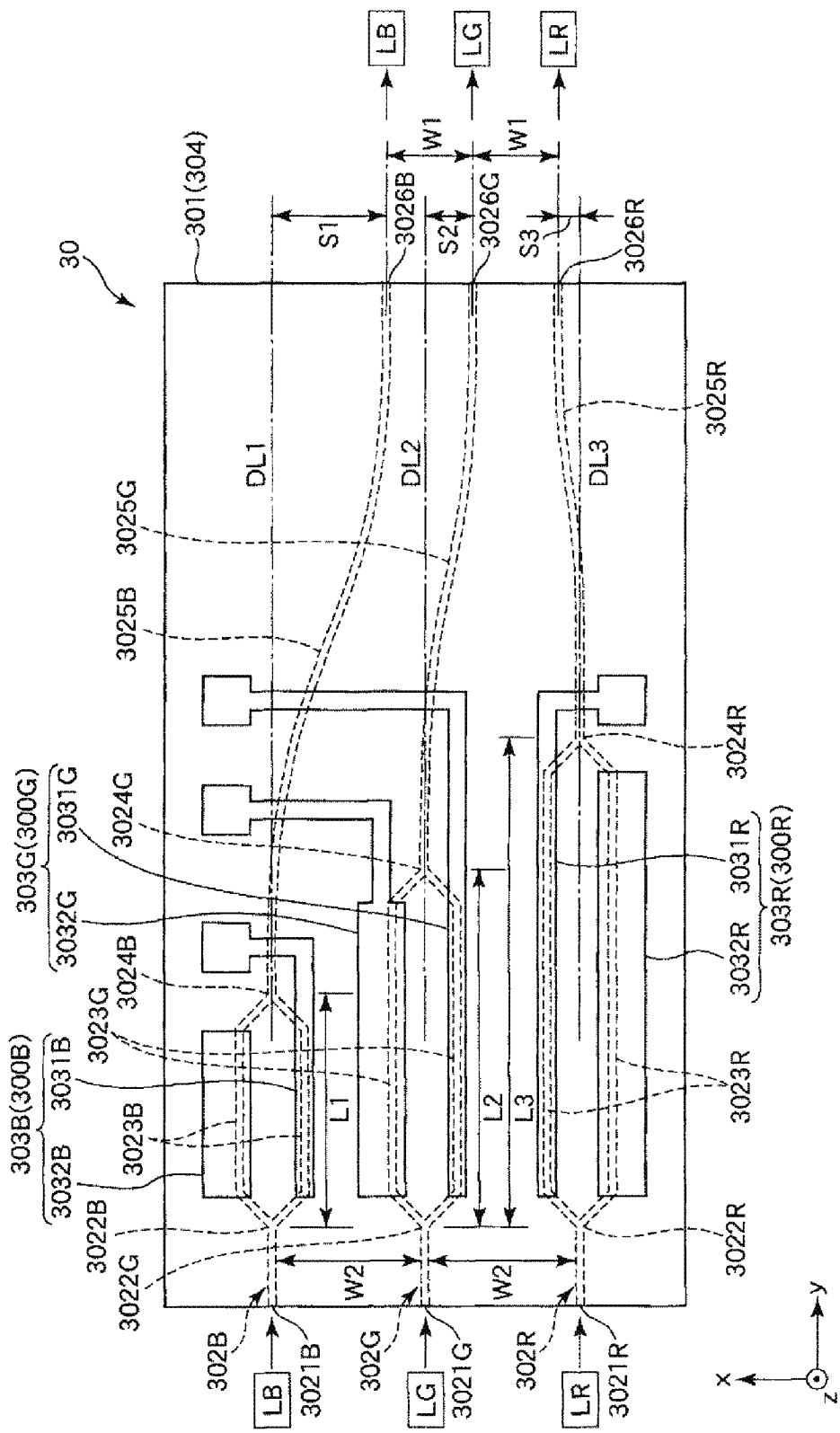
FIG. 8 is a plan view of the modulator shown in FIG. 7.

FIG. 1 shows a schematic configuration of the image display apparatus (head mounted display) according to the first embodiment. FIG. 2 is a partial enlarged view of the image display apparatus shown in FIG. 1. FIG. 3 is a schematic configuration diagram of a signal generator of the image display apparatus shown in FIG. 1. FIG. 4 shows a schematic configuration of a light sweeper provided in a swept light output section shown in FIG. 1. FIG. 5 diagrammatically describes an effect of the image display apparatus shown in FIG. 1. FIG. 6 shows the trajectories of swept signal light fluxes in an image formation plane according to the first embodiment. FIG. 7 is a perspective view showing a schematic configuration of a modulator shown in FIG. 4. FIG. 8 is a plan view of the modulator shown in FIG. 7.

FIG. 1 shows an X axis, a Y axis, and a Z axis as three axes perpendicular to one another for ease of description. It is assumed that the front end side of each illustrated arrow represents the "+ (positive)" side and the base end side of the arrow represents the "− (negative)" side. In the following description, the direction parallel to the X axis is called an "X-axis direction," the direction parallel to the Y axis is called a "Y-axis direction," and the direction parallel to the Z axis is called a "Z-axis direction."

The X, Y, and Z axes are set as follows: When an image display apparatus 1, which will be described later, is attached to a user's head H, the upward/downward direction with respect to the head H is the Y-axis direction; the rightward/leftward direction with respect to the head H is the Z-axis direction; and the frontward/rearward direction with respect to the head H is the X-axis direction.

An image display apparatus 1 according to the present embodiment is a head mounted display (head mounted image display apparatus) having a spectacle-like exterior appearance, attached to the user's head H for use, as shown in FIG. 1, and allows the user to visually recognize an image in the form of a virtual image with an outside image superimposed thereon.

The image display apparatus 1 includes a frame 2, a signal generator 3, a swept light output section 4, and a reflector 6, as shown in FIG. 1.

The image display apparatus 1 further includes a first optical fiber 71, a second optical fiber 72, and a connector 5, as shown in FIG. 2.

The image display apparatus 1 operates as follows: The signal generator 3 generates signal light fluxes modulated in accordance with image information; the signal light fluxes are guided via the first optical fiber 71, the connector 5, and the second optical fiber 72 to the swept light output section 4; the swept light output section 4 sweeps the signal light fluxes (video light fluxes) two-dimensionally and outputs the swept light fluxes; and the reflector 6 reflects the swept light fluxes toward the user's eyes EY. The user can thus visually recognize a virtual image according to the image information.

The present embodiment will be described with reference to a case where the signal generator 3, the swept light output section 4, the connector 5, the reflector 6, the first optical fiber 71, and the second optical fiber 72 are provided only on the right side of the frame 2 and only a virtual image for the right eye is formed. Instead, the configuration on the right side of the frame 2 may be duplicated on the left side thereof so that a virtual image for the left eye is also formed as well as the virtual image for the right eye, or only a virtual image for the left eye may be formed.

The component that optically connects the signal generator 3 to the swept light output section 4 is not limited to an optical fiber and can instead, for example, be any of a variety of light guides. Further, the configuration in which the connector 5 connects the first optical fiber 71 and the second optical fiber 72 to each other may not be employed, and only the first optical fiber 71 may optically connect the signal generator 3 to the swept light output section 4 without via the connector 5.

The portions of the image display apparatus 1 will be sequentially described below in detail.

Frame

The frame 2 has a spectacle-frame-like shape and has a function of supporting the image generators 3 and the swept light output section 4, as shown in FIG. 1.

The frame 2 includes a front section 22, which supports the swept light output section 4 and nose pads 21, a pair of temples (bows) 23, which are connected to the front section 22 and come into contact with the user's ears, and tip sections 24, which are end portions of the temples 23 that face away from the front section 22, as shown in FIG. 1.

The nose pads 21 come into contact with the user's nose NS when the image display apparatus 1 is in use and support the image display apparatus 1 with respect to the user's head. The front section 22 includes a rim 25 and a bridge 26.

The nose pads 21 are configured to be capable of adjusting the position of the frame 2 relative to the user when the image display apparatus 1 is in use.

The frame 2 does not necessarily have the shape shown in FIG. 1 and can have a shape that allows the frame 2 to be attached to the user's head H.

Signal Generator

The signal generator 3 is provided at one of the tip sections 24 (right tip section 24 in the present embodiment) (tip sections 24 are end portions of the temples 23 that face away from the front section 22) of the frame 2 described above, as shown in FIG. 1.

That is, the signal generator 3 is disposed on the side opposite the eyes EY with respect to the user's ears EA when the image display apparatus 1 is in use. The arrangement allows excellent weight balance of the image display apparatus 1.

The signal generator 3 has a function of generating signal light fluxes to be swept by a light sweeper 42 of the swept light output section 4, which will be described later, and further has a function of generating drive signals for driving the light sweeper 42.

The thus configured signal generator 3 includes a signal light flux generation section 31, a drive signal generation section 32, a control section 33, light detection sections 34, and a fixing section 35, as shown in FIG. 3.

The signal light flux generation section 31 generates signal light fluxes to be swept (light sweeping) by the light sweeper 42 (light scanner) of the swept light output section 4, which will be described later.

The signal light flux generation section 31 includes a plurality of light sources 311R, 311G and 311B, which emit light fluxes having different wavelengths, a plurality of drive circuits 312R, 312G and 312B, and lenses 313R, 313G and 313B.

The light source 311R (R light source) emits a red light flux LR (third light flux) as one of the signal light fluxes. The light source 311G (G light source) emits a green light flux LG (second light flux) as one of the signal light fluxes. The light source 311B (B light source) emits a blue light flux LB (first light flux) as one of the signal light fluxes. Use of the light fluxes of the three colors allows display of a full-color image. In a case where no full-color image is displayed, a light flux of one color or light fluxes of two colors may be used, or to enhance the color rendering property of a full-color image, light fluxes of four or more colors (four or more light sources) may be used.

Each of the light sources 311R, 311G, and 311B is not limited to a specific light source and can, for example, be a laser diode or an LED.

The light sources 311R, 311G, and 311B are electrically connected to the drive circuits 312R, 312G, and 312B, respectively.

In the following description, the light sources 311R, 311G and 311B are also collectively called "a light source section 311," and the signal light fluxes generated by the signal light flux generation section 31 are also called "light fluxes outputted from light source section 311."

The drive circuit 312R has a function of driving the light source 311R described above. The drive circuit 312G has a function of driving the light source 311G described above. The drive circuit 312B has a function of driving the light source 311B described above.

The three light fluxes (light fluxes of three colors) emitted from the light sources 311R, 311G, and 311B driven by the drive circuits 312R, 312G, and 312B pass through the lenses 313R, 313G and 313B and impinge on the light detection sections 34.

Each of the lenses 313R, 313G and 313B is a collimator lens. The light fluxes emitted from the light sources 311R, 311G, and 311B are therefore converted into parallelized light fluxes. Each of the lenses 313R, 313G and 313B may have a coupling function (collector lens) of causing the light flux to enter the first optical fiber 71.

The signal light fluxes generated by the signal light flux generation section 31 enter one end of the first optical fiber 71. The signal light fluxes then pass through the first optical fiber 71, the connector 5, and the second optical fiber 72 in this order and are transported to the light sweeper 42 of the swept light output section 4, which will be described later.

The drive signal generation section 32 generates drive signals for driving the light sweeper 42 (light scanner) of the swept light output section 4, which will be described later.

The drive signal generation section 32 includes a drive circuit 321, which generates a drive signal used for horizontal sweeping performed by the light sweeper 42, and a drive circuit 322, which generates a drive signal used for vertical sweeping performed by the light sweeper 42.

The thus configured drive signal generation section 32 is electrically connected to the light sweeper 42 of the swept light output section 4, which will be described later, via signal lines that are not shown. The drive signals generated by the drive signal generation section 32 are thus inputted to the light sweeper 42 of the swept light output section 4, which will be described later.

The drive circuits 312R, 312G and 312B of the signal light flux generation section 31 and the drive circuits 321 and 322 of the drive signal generation section 32 described above are electrically connected to the control section 33.

The control section 33 has a function of controlling drive operation of the drives circuits 312R, 312G, and 312B of the signal light flux generation section 31 and the drive circuits 321 and 322 of the drive signal generation section 32 on the basis of a video signal (image signal). That is, the control section 33 has a function of controlling drive operation of the swept light output section 4. Therefore, the signal light flux generation section 31 generates the signal light fluxes, and the drive signal generation section 32 generates drive signals according to image information.

The control section 33 is electrically connected to a modulator 30, which will be described later, via a signal line that is not shown. A modulator drive signal generated by the control section 33 is thus inputted to the modulator 30, which will be described later. The modulator drive signal allows the red light flux LR, the green light flux LG, and the blue light flux LB that enter the modulator 30 to be modulated individually and coordinately with respect to one another, whereby light fluxes of colors and luminance levels according to the image information can be projected at appropriate timing.

The control section 33 is further configured to reflect information on the intensities of the light fluxes detected by the light detection sections 34 in the control of the drive operation performed by the drive circuits 312R, 312G, and 312B of the signal light flux generation section 31 and other types of drive operation.

Light Detection Sections and Fixing Section

The fixing section 35 has a function of fixing the first optical fiber 71 and further fixing the light detection sections 34. The light detection sections 34 can detect the amounts of light fluxes outputted from the light source section 311 (signal light flux fluxes) excluding light fluxes that enter the first optical fiber 71 and feed the detected light fluxes back to the control section 33 for adjustment of the intensities of the light fluxes emitted from the light sources 311B, 311G, and 311R.

The first optical fiber 71 is optically connected to the second optical fiber 72 via the connector 5, as described above.

Each of the first optical fiber 71 and the second optical fiber 72 is formed, for example, of a multicore optical fiber (three-core optical fiber in the present embodiment) that allows the color signal light fluxes (red light flux LR, green flux LG, and blue light flux LB in the present embodiment) to be transmitted independently of each other, as shown in FIG. 3. Each of the first optical fiber 71 and the second optical fiber 72 may instead be formed of a plurality of single-core optical fibers in the form of a bundle.

It is not essential to provide the fixing section 35 described above, and a configuration in which the light fluxes outputted from the light source section 311 are coupled with the first optical fiber 71 without intentional attenuation may be employed. Further, it is not essential that the light detection sections 34 are supported by the fixing section 35, and the light detection sections 34 are not necessarily arranged in a specific manner and can be disposed in any positions where the light detection sections 34 can detect the amounts of light fluxes from the light source section 311.

Swept Light Output Section

The swept light output section 4 is attached to a portion in the vicinity of the bridge 26 of the frame 2 described above (in other words, in the vicinity of the center of the front section 22), as shown in FIGS. 1 and 2.

The thus arranged swept light output section 4 includes a housing 41 (enclosure), the light sweeper 42, lenses 43, the modulator 30, a lens 44, a lens 45, and a support member 46, as shown in FIG. 4.

The housing 41 is attached to the front section 22 via the support member 46.

The outer surface of the housing 41 is bonded to a portion opposite the frame 2 with respect to the support member 46.

The housing 41 supports and accommodates the light sweeper 42. Further, the lens 45 is so attached to the housing 41 as to form part of the housing 41 (part of wall thereof).

A reflector 10 has a function of reflecting the signal light fluxes having exited out of the second optical fiber 72 toward the light sweeper 42. The reflector 10 is provided in a recess 27, which opens toward the interior of the front portion 22. The opening of the recess 27 may be covered with a window made of a transparent material. The reflector 10 is not limited to a specific component and may be any component capable of reflecting the signal light fluxes, for example, a mirror or a prism.

The lenses 43 are provided between the reflector 10 and the modulator 30, which will be described later. Specifically, a lens 43R is provided on the optical path that connects a core 72R, which is one of the cores of the second optical fiber 72 and through which the red light flux LR exits, to the modulator 30. Similarly, a lens 43G is provided on the optical path that connects a core 72G, which is one of the cores of the second optical fiber 72 and through which the green light flux LG exits, to the modulator 30, and a lens 43B is provided on the optical path that connects a core 72B, which is one of the cores of the second optical fiber 72 and through which the blue light flux LB exits, to the modulator 30.

Each of the lenses 43 has a function of adjusting the spot diameter of the corresponding signal light flux having exited out of the second optical fiber 72 and causing the signal light flux to enter the modulator 30 (coupling function).

The signal light fluxes having passed through the lenses 43 pass through the modulator 30, which will be described later, and impinge on the lens 44.

The lens 44 has a function of parallelizing the light fluxes having exited out of the modulator 30 (collimator function). The signal light fluxes having passed through the lens 44 impinge on the light sweeper 42.

The light sweeper 42 is a light scanner that spatially (two-dimensionally) sweeps the signal light fluxes from the signal light flux generation section 31 and directs the swept signal light fluxes toward the reflector 6. Specifically, the signal light fluxes are caused to impinge on a light reflection surface of the light sweeper 42, and the light sweeper 42 is driven in accordance with the drive signals generated by the drive signal generation section 32. The signal light fluxes are thus two-dimensionally swept.

The thus configured light sweeper 42 is a light scanner swingable around two axes. A mirror (light reflector) swings around axes J1 and J2, as shown in FIG. 5. The signal light fluxes reflected off the mirror can thus be two-dimensionally swept in two directions, a first direction (horizontal direction) around the axis J1 and a second direction (vertical direction) around the axis J2.

Use of the light scanner swingable around the two axes as the light sweeper 42 allows not only simplification of the configuration and arrangement (alignment, in particular) of the light sweeper 42 but also reduction in size of the light sweeper 42. The configuration of the light sweeper 42 is not limited to the configuration in the present embodiment and may be any configuration that allows the signal light fluxes to be two-dimensionally swept. For example, the light sweeper 42 may be formed of two light scanners each of which sweeps the signal light fluxes one-dimensionally or may be formed of a galvanometric mirror in place of the light scanner.

The light sweeper 42 has a coil 17 and a signal superposition section 18 (see FIG. 4), and the coil 17, the signal superposition section 18, and the drive signal generation section 32 form a driver that drives the light sweeper 42.

The signal light fluxes swept by the light sweeper 42 (swept light fluxes) exit out of the housing 41 via the lens 45, are further reflected off the reflector 6, and then enter on the eye EY.

The drive circuits 312R, 312G, and 312B of the signal light flux generation section 31 allow the signal light fluxes to be outputted when the light sweeper 42 that swings toward one side around the axis J1 but do not allow the signal light fluxes to be outputted when the light sweeper 42 swings toward the other side. Therefore, the light sweeper 42 sweeps the signal light fluxes when the light sweeper 42 swings toward one side around the axis J1 but does not sweep the signal light fluxes when the light sweeper 42 swings toward the other side. That is, the signal light fluxes are swept along only one of forward and backward paths in the first direction.

FIG. 6 shows a sweep trajectory TR, a sweep trajectory TG, and a sweep trajectory TB of the signal light fluxes (red light flux LR, green light flux LG, and blue light flux LB) in an image formation plane according to the present embodiment. The image formation plane is a plane in which an image is formed by the image display apparatus 1. In other words, the image formation plane is a plane where the signal light fluxes swept by the light sweeper 42 are brought into focus (form an image). In the case of the image display apparatus 1 in the present embodiment, in which an image is directly drawn on a viewer's retina, the image formation plane is formed on the viewer's retina. In the case of another image display apparatus, such as a projector, the image formation plane is formed on a screen. In the image display apparatus 1, in which the signal light fluxes are swept along only one of forward and backward paths in the first direction, as described above, the sweep trajectories TR, TG, and TB are those shown in FIG. 6. In the following description, the lines arranged at equal intervals in the second direction are called "sweep lines LS," and it is assumed that the sweep trajectories TR, TG, and TB are formed on the sweep lines LS. It is further assumed that the plurality of sweep lines LS are formed of LS1 (first sweep line), LS2 (second sweep line), LS3 (third sweep line), . . . , sequentially from the upper side. In the present embodiment, in an image display region S, which is visually recognized as an image by the viewer, the sweep lines LS correspond to horizontal sweep lines for image display. In FIG. 6, each of LS1, LS2, LS3, . . . is labeled only with the number of the sweep line LS at the left end thereof and further labeled with the reference character of the sweep trajectory formed on the sweep line LS at the right end thereof.

The sweep trajectory TB of the blue light flux LB is located on the sweep lines LS1, LS4, LS7, . . . , the sweep trajectory TG of the green light flux LG is located on the sweep lines LS2, LS5, LS8, . . . , and the sweep trajectory TR of the red light flux LR is located on the sweep lines LS3, LS6, LS9, . . . , as shown in FIG. 6. That is, each of the red light flux LR, the green light flux LG, and the blue light flux LB is swept every three sweep lines LS, and the sweep trajectories TR, TG, and TB are sequentially arranged on the sweep line LS1 and the following sweep lines LS in a repeated manner in such a way that they are not superimposed on one another. Further, the point irradiated with the red light flux LR, the point irradiated with the green light flux LG, and the point irradiated with the blue light flux LB at a certain point of time are arranged side by side in the second direction, as shown in the form of three points in FIG. 6, and swept in the first and second directions with the positional relationship maintained. The point irradiated with the red light flux LR, the point irradiated with the green light flux LG, and the point irradiated with the blue light flux LB are not necessarily arranged side by side in the second direction, and the sweep trajectories TR, TG, and TB only need to be arranged side by side in the second direction. For example, the irradiated points only need to be arranged in a direction that intersects the first direction. Further, the sweep lines LS do not intersect each other and are arranged at equal intervals in the second direction in any portion in the first direction (central portion and opposite end portions). An image having uniform pixel density and small brightness unevenness can therefore be displayed.

The arrangement of the sweep trajectories TR, TG, and TB described above in the image display region S allows the viewer to recognize a two-dimensional image with the aid of an afterimage phenomenon that occurs in the eye EY. Causing the red light flux LR, the green light flux LG, and the blue light flux LB to blink independently of each other allows a recognized two-dimensional image to have color and brightness according to image information (full-color image, for example).

The sweeping pattern described above is presented by way of example. For example, a sweeping pattern in which the sweep trajectories TR, TG, and TB are superimposed on one another on the same sweep line LS may be employed, as in a second embodiment, which will be described later. In this case, the resolution in the vertical direction can be further increased.

Since the sweeping speed is lower in opposite end portions of each of the sweep lines LS than in a central portion thereof so that a large amount of distortion is produced in the vertical direction (second direction), it is preferable that the end portions are excluded from the image display region S. Setting the image display region S as shown in FIG. 6 allows a more homogeneous, high-precision image to be displayed. Further, in the present embodiment, the sweep lines LS extend obliquely with respect to the horizontal direction (first direction). The sweep lines LS may therefore be so set as to be as parallel to the frame of the image display region S as possible, for example, by slightly inclining the light sweeper 42. As a result, the quality of a displayed image can be further improved.

The lenses 43, 44, and 45 accommodated in the light sweeper 42 may be provided as required and may be omitted or replaced with other optical elements. Further, the lenses are not necessarily disposed in the positions described above and may instead be disposed, for example, between the second optical fiber 72 and the reflector 10.

The lenses 43 may be formed of a set of a plurality of lenses, as shown in FIG. 4 or may instead be formed of lenses bonded to each other (lens array).

Modulator

The signal light fluxes having exited out of the second optical fiber 72 enter the modulator 30 (embodiment of light modulator) provided between the reflector 10 and the light sweeper 42, as described above.

The modulator 30 includes a substrate 301, optical waveguides 302R (third optical waveguide), 302G (second optical waveguide), and 302B (first optical waveguide) formed in the substrate 301, electrodes 303R, 303G, and 303B provided on the substrate 301, and a buffer layer 304 interposed between the substrate 301 and the electrodes 303R, 303G, 303B.

The substrate 301 has a flat-plate-like shape that is oblong in a plan view and is made of a material showing an electro-optical effect. The electro-optical effect is a phenomenon in which the refractive index of a material changes when an electric field is applied to the material. Examples of the electro-optical effect include the Pockels effect, in which the refractive index changes in proportion to the electric field, and the Kerr effect, in which the refractive changes in proport ion to the square of the electric field. Each of the optical waveguides is so formed in the thus configured substrate 301 as to be bifurcated in a halfway position along the optical waveguide, and application of an electric field to the substrate 301 allows the refractive index of one of the bifurcated optical waveguides to be changed. Using this phenomenon allows light propagating through one of the bifurcated optical waveguides to have a phase difference with respect to light propagating through the other one of the bifurcated optical waveguides, and merging the bifurcated light fluxes again allows intensity modulation based on the phase difference.

In the following description, it is assumed for ease of description that the direction parallel to the short sides of the substrate 301 is an x direction, the direction parallel to the long sides of the substrate 301 is a y direction, and the thickness direction of the substrate 301 is a z direction. In FIGS. 7 and 8, an x axis parallel to the x direction, a y axis parallel to the y direction, and a z axis parallel to the z direction are drawn in the form of arrows. It is assumed that the front end side of the x axis represents the "+ (positive)" side and the base end side of the x axis represents the "− (negative)" side. The same holds true for the y and z axes.

Examples of the material showing the electro-optical effect may include a lithium niobate ($LiNbO_3$), a lithium tantalite ($LiTaO_3$), lead lanthanum zirconate titanate (PLZT), a potassium phosphate titanate ($KTiOPO_4$), or any other inorganic material, polythiophene, and a liquid crystal material as well as an electro-optically active polymer to which charge transport molecules are doped, a charge transport polymer to which an electro-optical dye is doped, an inactive polymer to which charge transport molecules and an electro-optical dye are doped, a polymer containing a charge transport part and an electro-optical part at the primary chain or a side chain of the polymer, and an organic material to which tricyanofuran (TCF) is doped as an acceptor.

Among the materials described above, the lithium niobate is particularly used as a preferable material. The lithium niobate, which has a relatively large electro-optical coefficient, allows the voltage that drives the modulator 30 to be lowered when the modulator 30 modulates the optical intensity and further allows the size of the modulator 30 to be reduced.

Each of the materials is preferably a single crystal material or a solid solution crystal material. Such a material gives the substrate 301 transparency, whereby the optical waveguides 302R, 302G, and 302B formed in the substrate 301 are allowed to have high light transmission efficiency.

The optical waveguides 302R, 302G, and 302B are optically independent of one another and provided in parallel to one another. The red light flux LR (third light flux) enters the optical waveguide 302R, the green light flux LG (second light flux) enters the optical waveguide 302G, and the blue light flux LB (first light flux) enters the optical waveguide 302B.

In FIGS. 7 and 8, the optical waveguides 302R, 302G, and 302B are arranged in this order from the −x side toward the +x side. It can also be said that the order is a descending order of the wavelength of the light fluxes that enter the optical waveguides. For example, since the red light flux LR, the wavelength of which is longer than the wavelength of the green light flux LG, enters the optical waveguide 302R, the optical waveguide 302R is located on the side opposite the optical waveguide 302B with respect to the optical waveguide 302G. Since the light fluxes of the three colors enter the modulator 30, and the modulator 30 can modulate the light fluxes independently of one another, as described above, the image display apparatus 1 can display a multi-color image, for example, a full-color image.

Although each of the optical waveguides 302R, 302G, and 302B may be a member separate from the substrate 301 (optical fiber, optical waveguide, or any other optical component made of glass or resin), each of the optical waveguides is formed by modification of part of the substrate 301 in the present embodiment. To form the optical waveguides 302R, 302G, and 302B in the substrate 301, for example, a proton exchange method or a Ti diffusion method can be used. The proton exchange method is a method in which a substrate is immersed in an acid solution so that protons are allowed to penetrate into the substrate in exchange for elution of ions in the substrate and change the refractive index of the region into which the protons have penetrated. According to the method, optical waveguides 302R, 302G, and 302B that excellent particularly in light resistance can be produced. On the other hand, the Ti diffusion method is a method in which a Ti film is formed on a substrate and the substrate is then so heated that Ti diffuses into the substrate to change the refractive index of the region into which Ti has diffused.

Each of the thus formed optical waveguides 302R, 302G, and 302B is formed of a core section where the refractive index is higher than the other portion of the substrate 301 and which is an elongated portion that extends in the y direction and a cladding section which is adjacent to the core section and where the refractive index is lower than that of the core section. In the present specification, only the core section is referred to as an "optical waveguide" in some cases for convenience of description.

In the following description, the side of the optical waveguide 302B that the blue light flux LB enters is called an "entrance side," and the side of the optical waveguide 302B through which the blue light flux LB having propagated exits is called an "exit side." The same holds true for the optical waveguides 302G and 302R.

The optical waveguide 302B includes an entrance section 3021B (first entrance section), which is a portion that the blue light flux LB enters, and an exit section 3026B (first exit section), which is a portion through which the blue light flux LB having propagated through the optical waveguide 302B exits.

The optical waveguide 302B further includes a bifurcation section for modulation 3022B, which is located on the exit side of the entrance section 3021B and bifurcates the optical waveguide 302B into two, a merging section for modulation 3024B, which merges the bifurcated optical waveguides 302B into a single optical waveguide 302B again, two linear sections for modulation 3023B, 3023B, which connect the bifurcation section for modulation 3022B to the merging section for modulation 3024B, and a linkage section 3025B (first linkage section), which links the merging section for modulation 3024B with the exit section 3026B.

Similarly, the optical waveguide 302G includes an entrance section 3021G (second entrance section), which is a portion that the green light flux LG enters, and an exit section 3026G (second exit section), which is a portion through which the green light flux LG having propagated through the optical waveguide 302G exits.

The optical waveguide 302G further includes a bifurcation section for modulation 3022G, which is located on the exit side of the entrance section 3021G and bifurcates the optical waveguide 302G into two, a merging section for modulation 3024G, which merges the bifurcated optical waveguides 302G into a single optical waveguide 302G again, two linear sections for modulation 3023G, 3023G, which connect the bifurcation section for modulation 3022G to the merging section for modulation 3024G, and a linkage section 3025G (second linkage section), which links the merging section for modulation 3024G with the exit section 3026G.

Similarly, the optical waveguide 302R includes an entrance section 3021R (third entrance section), which is a portion that the red light flux LR enters, and an exit section 3026R (third exit section), which is a portion through which the red light flux LR having propagated through the optical waveguide 302R exits.

The optical waveguide 302R further includes a bifurcation section for modulation 3022R, which is located on the exit side of the entrance section 3021R and bifurcates the optical waveguide 302R into two, a merging section for modulation 3024R, which merges the bifurcated optical waveguides 302R into a single optical waveguide 302R again, two linear sections for modulation 3023R, 3023R, which connect the bifurcation section for modulation 3022R to the merging section for modulation 3024R, and a linkage section 3025R (third linkage section), which links the merging section for modulation 3024R with the exit section 3026R.

Each of the entrance sections 3021R, 3021G, and 3021B is located at an end surface corresponding to one of the short sides of the substrate 301, and each of the exit sections 3026R, 3026G, and 3026B is located at an end surface corresponding to the other short side of the substrate 301.

The red light flux LR that enters the entrance section 3021R therefore propagates while undergoing bifurcation and merging and exits through the exit section 3026R. The same holds true for the green light flux LG and the blue light flux LB.

Further, since the optical waveguides 302R, 302G, and 302B are optically independent of one another and provided in parallel to one another, as described above, the entrance sections 3021R, 3021G, and 3021B are also separate from one another along the x direction, and so are the exit sections 3026R, 3026G, and 3026B.

The optical waveguides 302R, 302G, and 302B are separate from each other with the cladding section having a predetermined width interposed between the adjacent optical waveguides so as not to be optically coupled with each other.

The optical axis of the light flux that exits through the exit section 3026R, the optical axis of the light flux that exits through the exit section 3026G, and the optical axis of the light flux that exits through the exit section 3026B may be non-parallel to one another but are preferably parallel to one another. In the latter case, the red light flux LR, the green light flux LG, and the blue light flux LB having exited through the exit sections are swept by the light sweeper 42 with the inter-light-flux distance maintained and focused in the image formation plane. The configuration in which the optical axes are parallel to one another therefore hardly results in a problem with the optical system, for example, the light fluxes do not reach the light sweeper 42, or a problem of a decrease in the resolution of a drawn image.

The state in which the optical axes are parallel to one another refers to a state in which variation in the angles of the optical axes is smaller than or equal to 0.1°.

The electrode 303R is provided in correspondence with the optical waveguide 302R. The electrode 303G is provided in correspondence with the optical waveguide 302G. The electrode 303B is provided in correspondence with the optical waveguide 302B.

Among the electrodes, the electrode 303R includes a signal electrode 3031R and a ground electrode 3032R. The signal electrode 3031R is so disposed as to overlie one of the two linear sections for modulation 3023R, 3023R in the plan view of the substrate 301. The ground electrode 3032R is so disposed as to overlie the other one of the two linear sections for modulation 3023R, 3023R.

Similarly, the electrode 303G includes a signal electrode 3031G and a ground electrode 3032G. The signal electrode 3031G is so disposed as to overlie one of the two linear sections for modulation 3023G, 3023G in the plan view of the substrate 301. The ground electrode 3032G is so disposed as to overlie the other one of the two linear sections for modulation 3023G, 3023G.

Similarly, the electrode 303B includes a signal electrode 3031B and a ground electrode 3032B. The signal electrode 3031B is so disposed as to overlie one of the two linear sections for modulation 3023B, 3023B in the plan view of the substrate 301. The ground electrode 3032B is so disposed as to overlie the other one of the two linear sections for modulation 3023B, 3023B.

Each of the ground electrodes 3032R, 3032G, and 3032B is electrically grounded. On the other hand, potentials based on electric signals are given to the signal electrodes 3031R, 3031G, and 3031B so that potential differences are produced between the signal electrodes 3031R, 3031G, and 3031B and the ground electrodes 3032R, 3032G, and 3032B. When potential differences (voltages) are produced between the signal electrodes 3031R, 3031G, and 3031B and the ground electrodes 3032R, 3032G, and 3032B as described above, lines of electric force produced therebetween pass through the core sections in the optical waveguides 302R, 302G, and 302B. Since the lines of electric force passing through, for example, the two linear sections for modulation 2032R, 2032R are oriented in opposite directions, the refractive index changes on the basis of the electro-optical effect in opposite directions in the two linear sections for modulation 2032R, 2032R. A phase difference according to a change in the refractive index is therefore produced between the red light flux LR passing through one of the linear sections for modulation 3023R and the red light flux LR passing through the other linear section for modulation 3023R. The two red light fluxes LR with the thus produced phase difference therebetween merge with each other at the merging section for modulation 3024R, whereby the modulator 30 can output a light flux having intensity (exit intensity) attenuated with respect to the intensity of the light flux before it enters the modulator 30 (entrance intensity). The same holds true for the green light flux LG and the blue light flux LB, and the modulator 30 also outputs intensity-modulated light fluxes.

In the process described above, the phase difference described above can be controlled by adjustment of the potential differences produced between the signal electrodes 3031R, 3031G, and 3031B and the ground electrodes 3032R, 3032G, and 3032B, whereby the width of the modulation of the entrance intensity can be controlled. Therefore, the electrode 303B forms a modulation section 300B (first modulation section) capable of modulating the intensity of the blue light flux LB, the electrode 303G forms a modulation section 300G (second modulation section) capable of modulating the intensity of the green light flux LG, and the electrode 303R forms a modulation section 300R (third modulation section) capable of modulating the intensity of the red light flux LR.

The thus configured modulation sections 300R, 300G, and 300B can modulate the intensities of the red light flux LR, the green light flux LG, and the blue light flux LB to arbitrary values.

For example, the exit intensity can be substantially zero by setting the voltage applied to the electrode 303R in such a way that the difference in phase between the red light flux LR passing through one of the linear sections for modulation 3023R and the red light flux LR passing through the other linear section for modulation 3023R is half the wavelength at the merging section for modulation 3024R.

The exit intensity can be roughly equal to the entrance intensity by setting the voltage applied to the electrode 303R in such a way that the difference in phase between the red light flux LR passing through one of the linear sections for modulation 3023R and the red light flux LR passing through the other linear section for modulation 3023R is equal to each other at the merging section for modulation 3024R.

The same holds true for the green light flux LG and the blue light flux LB.

Providing the thus configured modulator 30 allows the red light flux LR, the green light flux LG, and the blue light flux LB to be modulated independently of one another and the modulated red light flux LR, green light flux LG, and blue light flux LB to be outputted toward the light sweeper 42. Since the modulator 30 performs the modulation outside the light source section, high-speed modulation is possible, as compared with a case where the red light flux LR, the green light flux LG, and the blue light flux LB are directly modulated in the light source section 311.

Further, in the image display apparatus 1, in which the light source section 311 is not directly involved in the modulation, the light source section 311 only needs to be so driven that signal light fluxes each having fixed intensity are outputted. The light source section 311 can therefore be driven under a high light emission efficiency condition or a highly stable light emission or wavelength condition, whereby the power consumption of the image display apparatus 1 can be lowered or the action of the image display apparatus 1 can be stabilized. Further, the quality of an image drawn on the retina of the eye EY can be increased. Moreover, since no drive circuit necessary for direct modulation of the light source section 311 is required, and a circuit that continuously drives the light source section 311 is relatively simple and inexpensive, reduction in cost and size of the light source section 311 can be achieved.

In the present embodiment, an example in which a hologram diffraction grating is used as the reflector 6 will be described later. In this case, the high wavelength stability of the signal light fluxes allows signal light fluxes having wavelengths close to designed wavelengths to impinge on the hologram diffraction grating. As a result, deviation of the angles of diffraction that occurs in the hologram diffraction grating from design values can be reduced, whereby image blur can be suppressed.

Further, in the present embodiment, the optical waveguides 302R, 302G, and 302B are formed in the single substrate 301. The size of the modulator 30 can therefore be reduced as compared with a case where the optical waveguides are formed on different substrates and then integrated with one another. As a result, the size of the image display apparatus 1 can be reduced. Further, since the optical waveguides 302R, 302G, and 302B can be formed in a single (monolithic) process, the positions where they are formed can be highly precise, whereby the directions in which the red light flux LR, the green light flux LG, and the blue light flux LB exit can be precisely aligned with one another. The quality of an image drawn on the retina of the eye E can therefore be increased.

The shapes and arrangements of the electrodes 303R, 303G, and 303B are set as appropriate in accordance with the direction of the crystal axis associated with the substrate 301 and other factors and are not limited to those shown in the drawings. For example, the electrode 303R may be so positioned as not to overlie the optical waveguide 302R in the plan view of the substrate 301.

The modulation method in the modulator 30 is not limited to what is called a Mach-Zehnder-type modulation method described above. An example of an alternative modulation method may include a directional-coupling-type modulation method.

The Mach-Zehnder-type modulation method, which can be implemented in a relatively simple structure and allows arbitrary adjustment of the modulation width, is useful as the modulation method in the modulator 30. Arbitrary adjustment of the modulation width, for example, allows an increase in contrast of a displayed image.

The buffer layer 304 is provided between the substrate 301 and the electrodes 303R, 303G, and 303B and made, for example, of a silicon oxide, alumina, or any other medium that does not absorb a large amount of light fluxes guided through the optical waveguides 302R, 302G, and 302B.

To increase the resolution of an image visually recognized by the viewer, it is conceivable to narrow the gaps between the sweep trajectories TR, TG, and TB of the signal light fluxes (red light flux LR, the green light flux LG, and the blue light flux LB) in the image formation plane.

Higher resolution can therefore be achieved by narrower exit gaps between the red light flux LR, the green light flux LG, and the blue light flux LB that exit out of the modulator 30. The exit gaps depend on the distance between the exit sections 3026R and 3026G described above (exit gap W1) and the distance between the exit sections 3026G and 3026B described above (exit gap W1) (see FIG. 8). It is therefore required to narrow the exit gap W1.

On the other hand, reducing the distance between the entrance sections 3021R and 3021G (entrance gap W2) and the distance between the entrance sections 3021G and 3021B (entrance gap W2) from a certain value is restricted in consideration of the physical size of the light sources 311R, 311G, and 311B. In consideration of the requirement described above, the entrance gap W2 is desirably greater than the exit gap W1. The gap size setting described above allows not only the image display apparatus 1 to provide high resolution but also the light sources to be readily arranged (optical system to be readily designed). To this end, the entrance gap W2 needs to be changed to the exit gap W1 in the modulator 30.

In the modulator 30 according to the present embodiment, the gap between the linkage sections 3025R and 3025G and the gap between the linkage sections 3025G and 3025B are configured to gradually narrow with distance from the entrance side toward the exit side.

In view of applications of the image display apparatus 1, reduction in size of the modulator 30 is also required. To reduce the size of the modulator 30, it is conceivable to sufficiently narrow the gap between optical waveguides adjacent to each other, that is, the gap between the optical waveguides 302R and 302G and the gap between the optical waveguides 302G and 302B. In this case, however, there is a problem of an increase in light loss based on crosstalk, in which the optical waveguides are optically coupled with each other and the light flux propagating through one of the optical waveguides leaks into the other optical waveguide. The crosstalk causes the light fluxes to be mixed up with each other, resulting in a decrease in the contrast of a drawn image, color shift thereof, and other problems therewith.

Further, since it is necessary to change the entrance gap W2 to the exit gap W1 in the linkage sections 3025R, 3025G, and 3025B, each of the linkage sections is so bent as to be displaced in the x direction while extending in the y direction. When an optical waveguide is bent, however, light loss (hereinafter also referred to as "bending loss") tends to occur, resulting in a decrease in brightness and contrast of a drawn image and other problems therewith.

In view of the problems described above, intensive studies have been conducted on solutions that allow the exit gap to be narrowed and the bending loss to be suppressed at the same time even in a reduced-size modulator. It has been found that when a predetermined relationship between the length of the modulation sections 300R, 300G, and 300B and the amount of displacement of the linkage sections 3025R, 3025G, and 3025B in the x direction is satisfied, the exit gap can be narrowed and the bending loss can be suppressed at the same time even in a reduced-size modulator.

Specifically, first define the following parameters: L1 is the length of the modulation section 300B (first modulation section); L2 is the length of the modulation section 300G (second modulation section); and L3 is the length of the modulation section 300R (third modulation section).

It is noted that, for example, the length L1 of the modulation section 300B is the longitudinal length of the modulation section 300B. In the present embodiment, the length L1 is the length in the y direction (direction connecting entrance side to exit side). In particular, when the modulation method in accordance with which the modulation section 300B performs the modulation is the Mach-Zehnder-type modulation method, the longitudinal direction is the direction in which the linear sections for modulation 3023B extend. The maximum longitudinal length of the portion that contributes to the modulation in the modulation section 300B is defined as L1. Specifically, the length along the y direction from the bifurcation point of the bifurcation section for modulation 3022B to the merging point of the merging section for modulation 3024B corresponds to L1.

The length L2 of the modulation section 300G and the length L3 of the modulation section 300R are also defined in the same manner as the length L1 of the modulation section 300B is defined.

Further, a reference line DL1 (first reference line) is defined as an imaginary straight line that is parallel to the longitudinal direction of the modulation section 300B and passes through the portion where the modulation section 300B is connected to the linkage section 3025B (merging point of merging section for modulation 3024B).

Similarly, a reference line DL2 (second reference line) is defined as an imaginary straight line that is parallel to the longitudinal direction of the modulation section 300G and passes through the portion where the modulation section 300G is connected to the linkage section 3025G (merging point of merging section for modulation 3024G).

Similarly, a reference line DL3 (third reference line) is defined as an imaginary straight line that is parallel to the longitudinal direction of the modulation section 300R and passes through the portion where the modulation section 300R is connected to the linkage section 3025R (merging point of merging section for modulation 3024R).

It is assumed that the parallel state used herein includes a state in which variation in the angles of the longitudinal directions is about 1° (manufacturing variation is not limited to 1'). Further, the first, second, and third reference lines are merely the names of the imaginary lines and can be replaced with first, second, and third lines, respectively.

Define S1 to be the distance between the reference line DL1 and the exit section 3026B (first exit section). It is noted that the distance between the reference line DL1 and the exit section 3026B is the minimum distance between the reference line DL1 and the exit section 3026B (length of perpendicular that can be drawn from exit section 3026B to reference line DL1).

Similarly, define S2 to be the distance between the reference line DL2 and the exit section 3026G (second exit section). It is noted that the distance between the reference line DL2 and the exit section 3026G is the minimum distance between the reference line DL2 and the exit section 3026G (length of perpendicular that can be drawn from exit section 3026G to reference line DL2).

Similarly, define S3 to be the distance between the reference line DL3 and the exit section 3026R (third exit section). It is noted that the distance between the reference line DL3 and the exit section 3026R is the minimum distance between the reference line DL3 and the exit section 3026R (length of perpendicular that can be drawn from exit section 3026R to reference line DL3).

Under the definitions described above, the modulator according to the present embodiment satisfies the relationship $L1<L2<L3$ and further satisfies the relationship $S1>S2>S3$. When these relationships are satisfied, the size of the modulator 30 can be readily reduced with an increase in the crosstalk between adjacent optical waveguides suppressed and an increase in light loss at the bent portions of the optical waveguides suppressed. As a result, the modulator 30 is characterized that it is compact and lightweight, has a small amount of bending loss, and has a sufficiently narrow exit gap. The thus characterized modulator 30 contributes to achievement of an image display apparatus 1 that is compact and lightweight and capable of displaying a high-resolution image.

Among the three primary color light fluxes, the blue light flux LB, which has the shortest wavelength, enters the modulation section 300B. Therefore, even the relatively shortened length L1 of the modulation section 300B can provide necessary and sufficient modulation performance. As a result, the relatively shortened length of the modulation section 300B can provide a relatively long length of the linkage section 3025B in the y direction at no sacrifice of the size of the substrate 301. Therefore, even when the amount of displacement of the linkage section 3025B in the x direction, that is, the distance S1 described above is so increased that the relationship $S1>S2>S3$ is satisfied, the long length of the linkage section 3025B in the y direction provides a spatial margin that allows a sufficiently large local bend radius. As a result, bending loss at the linkage section 3025B can be suppressed. Therefore, the entrance gap W2 can be increased and the exit gap W1 can be decreased with reduction in size of the modulator 30 and light loss therein.

On the other hand, among the three primary color light fluxes, the red light flux LR, which has the longest wavelength, enters the modulation section 300R. The length L3 of the modulation section 300R is therefore required to be relatively long. The length of the linkage section 3025R in the y direction is therefore required to be relatively shortened by the amount of the relatively elongated length of the modulation section 300R. Therefore, even when the amount of displacement of the linkage section 3025R in the x direction, that is, the distance S3 described above is reduced, setting S3 in such a way that the relationship $S1>S2>S3$ is satisfied allows too small a local bend radius not to be required. As a result, bending loss in the linkage section 3025R can be suppressed. Therefore, the entrance gap W2 can be increased and the exit gap W1 can be decreased with reduction in size of the modulator 30 and light loss therein.

Finally, among the three primary color light fluxes, the green light flux LG, which has an intermediate wavelength, enters the modulation section 300G. The amount of necessary displacement of the linkage section 3025G in the x direction is ensured by setting the length L2 of the modulation section 300G to satisfy the relationship L1<L2<L3 and the distance S2 between the reference line DL2 and the exit section 3026G to satisfy the relationship S1>S2>S3 with the bending loss in the linkage section 3025G suppressed. Therefore, the entrance gap W2 can be increased and the exit gap W1 can be decreased with reduction in size of the modulator 30 and light loss therein.

The present embodiment has been described with reference to the case where three channels of optical waveguides 302R, 302G, and 302B are provided so that light fluxes of the three colors are allowed to enter the modulator 30. Instead, two or four or more channels of optical waveguides may be provided so that light fluxes of two or four or more colors are allowed to enter the modulator 30.

In the two-channel system, for example, a form in which the optical waveguide 302R is omitted from the three-channel system described above and formed of the optical waveguides 302R, 302G, and 302B can be employed. In this case, the relationships L1<L2 and S1>S2 only need to be satisfied. As a result, both the decrease in the exit gap and the suppression of the bending loss can be achieved with reduction in size of the modulator.

In the case of the four-channel system, the position where the additional channel is provided only needs to be selected in accordance with the wavelength of a light flux caused to enter the additional channel. For example, when the wavelength of a light flux caused to enter the additional channel is shorter than the wavelength of the blue light flux LB, a form in which the additional optical waveguide is provided outside the optical waveguide 302B (on the side opposite the optical waveguide 302G with respect to the optical waveguide 302B) may be employed. On the other hand, when the wavelength of a light flux caused to enter the additional channel is longer than the wavelength of the red light flux LR, a form in which the additional optical waveguide is provided outside the optical waveguide 302R (on the side opposite the optical waveguide 302G with respect to the optical waveguide 302R) may be employed. Further, when the wavelength of a light flux caused to enter the additional channel is between the wavelength of the blue light flux LB and the wavelength of the green light flux LG, a form in which the additional optical waveguide is provided between the optical waveguide 302B and the optical waveguide 302G may be employed, and when the wavelength of a light flux caused to enter the additional channel is between the wavelength of the green light flux LG and the wavelength of the red light flux LR, a form in which the additional optical waveguide is provided between the optical waveguide 302G and the optical waveguide 302R may be employed.

To add another channel, for example, in a case where the wavelength of a light flux caused to enter the additional channel is longer than the wavelength of the red light flux LR, the following parameters are defined: the length of the modulation section corresponding to the additional optical waveguide is L4; a reference line associated with the modulation section is DL4; and the distance between the reference line DL4 and the exit section of the newly added optical waveguide is S4. The modulator 30 then only needs to be so configured that the relationships L1<L2<L3<L4 and S1>S2>S3>S4 are satisfied.

To further add another channel, a channel that a light flux having the shortest wavelength enters may be disposed in the uppermost position in FIG. 8, and other channels that light fluxes having gradually increasing wavelengths enter may then be arranged downward in FIG. 8 in the ascending order of wavelength. The length of the modulation section corresponding to the optical waveguide located in the uppermost position in FIG. 8 is newly set to be L1, the reference line associated with the modulation section is newly set to be DL1, and the distance between the reference line DL1 and the exit section of the optical waveguide is newly set to be S1. The lengths of the modulation sections corresponding to the optical waveguides arranged downward in FIG. 8 are set to be L2, L3, L4, . . . , the reference lines associated with the modulation sections are set to be DL2, DL3, DL4, . . . , and the distances between the reference lines and the exit sections of the optical waveguides are set to be S2, S3, S4, . . . . Under these settings, the modulator 30 only needs to be so configured that the relationships L1<L2<L3<L4< . . . and S1>S2>S3>S4> . . . are satisfied.

The light fluxes that enter the modulator 30 are not limited to the blue light flux LB, the green light flux LG, or the red light flux LR and may be light fluxes having other colors (other wavelengths).

The modulator 30 according to the present embodiment allows suppression of increases in crosstalk and bending loss with the size of the modulator 30 reduced, as described above.

For example, consider two optical waveguides parallel to each other and having a length of 1 cm, and define Lmin to be an inter-waveguide gap that causes a light loss proportion of 0.1% due to crosstalk. Further consider an optical waveguide having a bend portion, and define Rmin to be the bend radius that causes a bending loss proportion of 0.1% when a light flux is guided through the bent portion having a length of 1 mm. According to the present embodiment, the modulator 30 can be readily so designed that the gap between the optical waveguides is greater than or equal to Lmin and the bend radius of each of the optical waveguides is greater than or equal to Rmin across the entire modulator 30. In other words, even in the case where the above restriction is imposed, a modulator 30 in which the exit gap is narrower than the entrance gap with the size of the modulator 30 reduced can be provided.

The dimensions of Lmin and Rmin vary in according with the size of the modulator 30, the difference in refractive index between the core section and the cladding section of an optical waveguide, and other factors. As an example, Lmin is preferably greater than or equal to 2 μm but smaller than or equal to 50 μm, and Rmin is preferably greater than or equal to 1 μm/mm but smaller than or equal to 30 μm/mm.

The exit gap W1 is set as appropriate in accordance with the size of the image formation plane and other factors. As an example, the exit gap W1 is preferably greater than or equal to 0.005 mm but smaller than or equal to 1 mm.

The entrance gap W2 is set as appropriate in accordance with the size of the light sources and other factors. As an example, the entrance gap W2 is preferably greater than or equal to 0.1 mm but smaller than or equal to 3 mm.

In the modulator 30 shown in FIG. 8, the exit section 3026B (first exit section) is located below (on −x side of) the reference line DL1 (first reference line), that is, on the side facing the reference line DL3 (third reference line).

In the modulator 30 shown in FIG. 8, the exit section 3026G (second exit section) is located below (on −x side of) the reference line DL2 (second reference line), that is, on the side facing the reference line DL3.

In the modulator 30 shown in FIG. 8, the exit section 3026R (third exit section) is located above (on +x side of) the reference line DL3 (third reference line), that is, on the side facing the reference line DL1.

Employing the configuration described above particularly allows reduction in the size of the modulator 30. That is, the positions of the exit sections 3026B and 3026G can be closer to the exit section 3026R by displacement of the linkage sections 3025B and 3025G toward the −x side. The position of the exit section 3026R can be closer to the exit sections 3026B and 3026G by displacement of the linkage section 3025R toward the +x side. The sum of the distances S1, S2 and S3 can thus be particularly small, whereby the bend radii of the linkage sections 3025R, 3025G, and 3025B can be particularly large accordingly with the size of the modulator 30 further reduced or an increase in the size of the modulator 30 suppressed.

It is noted that the linkage section 3025R, for example, may be displaced toward the −x side, that is, the side opposite the reference line DL1. In this case, however, the amounts of displacement of the linkage sections 3025B and 3025G need to be increased as compared with the case where the linkage section 3025R is displaced toward the +x side. The sum of the distances S1, S2, and S3 therefore increases accordingly, undesirably resulting in an increase in the size of the modulator 30 and inevitable reduction in the bend radii of the linkage sections 3025R, 3025G, and 3025B. Further, depending on the amounts of displacement, the size of the modulator 30 undesirably increases (particularly in x direction).

In the two-channel system, for example, a form in which the optical waveguide 302B is omitted from the three-channel system described above and formed of the optical waveguides 302R, 302G, and 302B. In this case, the exit section 3026G is located in a position shifted from the reference line DL2 toward the −x side, that is, on the side facing the reference line DL3, and the exit section 3026R is located in a position shifted from the reference line DL3 toward the +x side, that is, on the side facing the reference line DL2. In this configuration, the sum of the distances S2 and S3 can be reduced, as compared with the case where the linkage section 3025R is displaced toward the −x side, whereby the bend radii of the linkage sections 3025R and 3025G can be increased accordingly.

Even in the case of four or more channels, it is preferable that only the exit section in the channel located in the lowermost position in FIG. 8 is located above the reference line of the channel, and that the exit sections in the other channels are located below the reference lines of the channels.

The swept light output section 4 has been described above, but the configuration of the swept light output section 4 is not limited to that shown in the drawings. For example, an arbitrary optical component may be disposed on the optical path in FIG. 4.

The light source section 311 and the modulator 30 according to the present embodiment are physically separate from each other, but they are optically connected to each other via the optical fibers and other optical components. A module formed of the thus configured light source section 311 and modulator 30 as constituent elements forms an optical module 100. The optical module 100 is a module capable of outputting light fluxes externally modulated by the modulator 30 in place of direct modulation of the light source section 311. Since the modulator 30 is allowed to perform the modulation with the light source section 311 continuously emitting light fluxes, not only is the light source section 311 stably driven, but also the high-speed modulation is performed by the modulator 30, whereby an optical module capable of stably outputting light fluxes modulated at high speed can be provided.

Reflector

The reflector 6 (reflection optical section) is attached to the rim 25, which is part of the front section 22 of the frame 2 described above, as shown in FIG. 1.

That is, the reflector 6 is so disposed as to be located in front of the user's eye EY and further away from the user than the light sweeper 42 when the image display apparatus 1 is in use. The arrangement allows no portion protruding forward with respect to the user's face to be present on the image display apparatus 1.

The reflector 6 has a function of reflecting the signal light fluxes from the light sweeper 42 toward the user's eye EY, as shown in FIG. 5.

In the present embodiment, the reflector 6 is a half-silvered mirror (semitransparent mirror) and also has a function of transmitting outside light (transparency to visible light). That is, the reflector 6 has a function of reflecting the signal light fluxes (video light fluxes) from the light sweeper 42 and transmitting outside light traveling from the space outside the reflector 6 toward the user's eye (combining function) when the image display apparatus 1 is in use. The function allows the user to visually recognize a virtual image (image) formed by the signal light fluxes while visually recognizing an outside image. That is, a see-through-type head mounted display can be achieved.

Among the portions of the reflector 6, the surface facing the user is a concave reflection surface. The signal light fluxes reflected off the reflector 6 therefore converge toward the user. The user can therefore visually recognize a virtual image so enlarged as to be greater than an image formed on the concave surface of the reflector 6. The user can thus recognize the virtual image with increased visibility.

On the other hand, among the portions of the reflector 6, the surface facing away from the user is a convex surface having roughly the same curvature as that of the concave surface described above. The outside light therefore reaches the user's eye without greatly deflected by the reflector 6. The user can therefore visually recognize an outside image having a small amount of distortion.

The reflector 6 may include a diffraction grating. In this case, the diffraction grating can be provided with a variety of optical features for reduction in the number of parts of the optical system and enhancement of the design flexibility. For example, a hologram diffraction grating can be used as the diffraction grating for adjustment of the direction in which the signal light fluxes reflected off the reflector 6 exit and selection of the wavelength of the reflected signal light fluxes. The diffraction grating can be further provided with a lens effect for adjustment of the state in which the entire swept light fluxes formed of the signal light fluxes reflected off the reflector 6 are focused and correction of aberrations produced when the signal light fluxes are reflected off the concave surface.

Further, in the present embodiment, use of the modulator 30, which is an external modulator, provides an effect of reduction in wavelength variation that occurs, for example, when the light sources are so driven as to blink. Diffraction angle variation in the diffraction grating is therefore suppressed, whereby an image having a small amount of image blur can be provided. Examples of the hologram diffraction grating described above may include a three-dimensional diffraction grating (volume hologram) made of an organic material and formed in an optical interference process and a diffraction grating made of a resin material and having a surface with protrusions and recesses formed with a stamper.

The reflector 6 may, for example, be a transparent substrate on which a semi-transparent/reflective film formed, for example, of a metal thin film or a dielectric multilayer film is formed or a polarizing beam splitter. When a polarizing beam splitter is used, the light sweeper 42 may be configured to output polarized signal light fluxes, and the polarizing beam splitter may be configured to reflect polarized light fluxes corresponding to the signal light fluxes from the light sweeper 42.

Second Embodiment

An image display apparatus according to a second embodiment will next be described.

Figure 9:
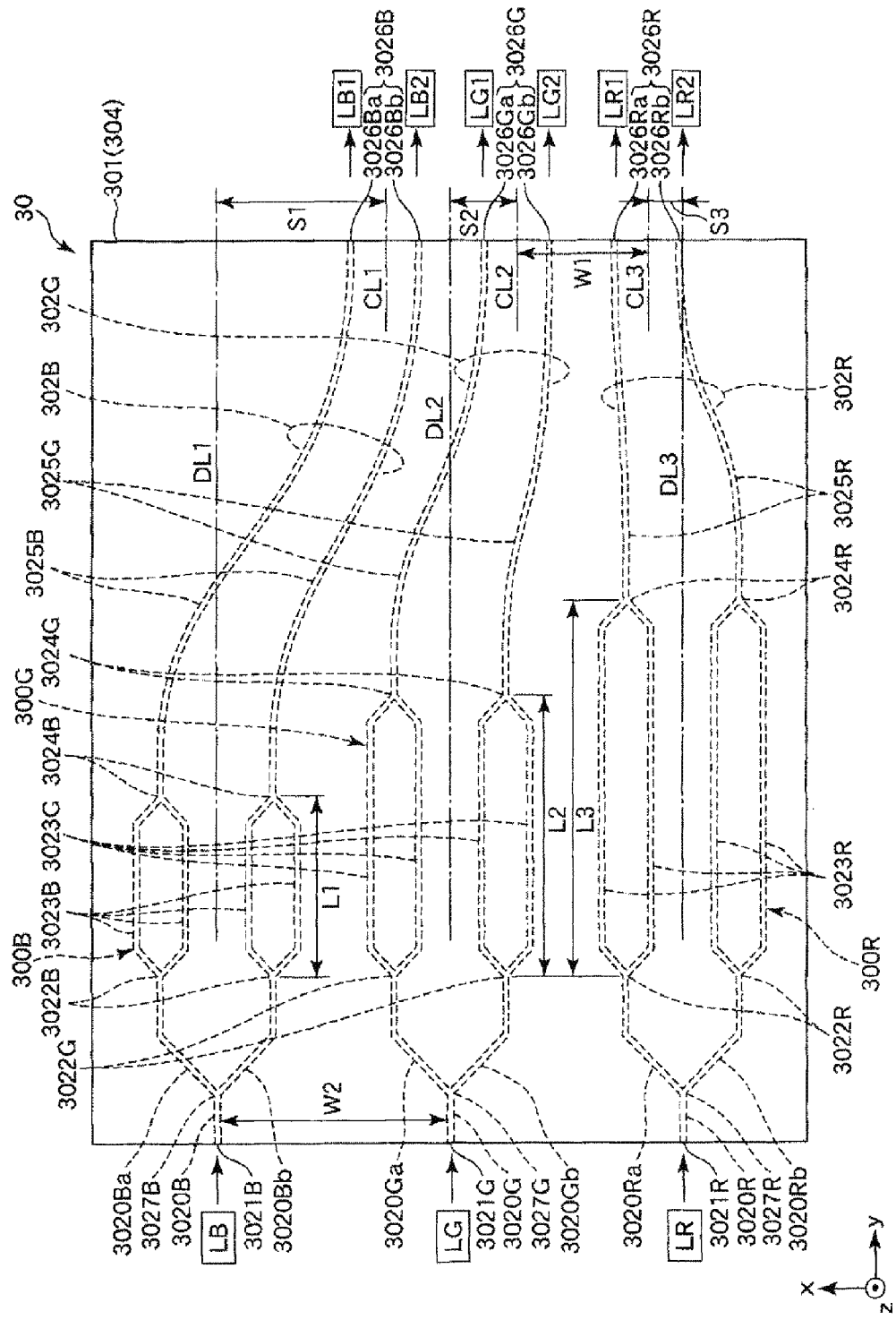
FIG. 9 is a plan view showing a schematic configuration of a modulator provided in an image display apparatus according to a second embodiment.

FIG. 9 is a plan view showing a schematic configuration of a modulator provided in the image display apparatus according to the second embodiment.

The second embodiment will be described below. In the following description, differences from the first embodiment described above will primarily be described, and description of the same items will be omitted. Further, in FIG. 9, the same items as those in the embodiment described above have the same reference characters.

In a modulator 30 according to the second embodiment, a bifurcation section for distribution 3027B (first bifurcation section) is provided between the entrance section 3021B and the bifurcation sections for modulation 3022B of the optical waveguide 302B, as shown in FIG. 9. The optical waveguide 302B therefore bifurcates into two in the immediate vicinity of the entrance section 3021B. As a result, the blue light flux LB that enters the optical waveguide 302B is distributed to two optical waveguides at the bifurcation section for distribution 3027B and eventually exits in the form of two light fluxes (blue light fluxes LB1 and LB2).

That is, the optical waveguide 302B according to the present embodiment includes a primary line 3020B (first primary line), which extends from the entrance section 3021B, and a branch line 3020Ba (first-a branch line (first branch line)) and a branch line 3020Bb (first-b branch line (second branch line)), which result from the bifurcation of the primary line 3020B at the bifurcation section for distribution 3027B.

Each of the branch lines 3020Ba and 3020Bb includes the bifurcation section for modulation 3022B, the two linear sections for modulation 3023B, the merging section for modulation 3024B, the linkage section 3025B (first-a linkage section (first branch line linkage section) or first-b linkage section (second branch line linkage section)), and the exit section 30261B (exit section 3026Ba or exit section 3026Bb), as in the first embodiment. In the optical waveguide 302B shown in FIG. 9, the blue light flux LB can therefore be modulated in the branch lines 3020Ba and 3020Bb independently of each other. In FIG. 9, only the positions of the modulation sections 300B (first-a modulation section (first branch line modulation section) and first-b modulation section (second branch line modulation section)) are shown, but the electrode 303B is omitted to avoid complexity of the figure.

Similarly, in the present embodiment, a bifurcation section for distribution 3027G (second bifurcation section) is provided between the entrance section 3021G and the bifurcation sections for modulation 3022G of the optical waveguide 302G, as shown in FIG. 9. The optical waveguide 302G therefore bifurcates into two in the immediate vicinity of the entrance section 3021G. As a result, the green light flux LG that enters the optical waveguide 302G is distributed to two optical waveguides at the bifurcation section for distribution 3027G and eventually exits in the form of two light fluxes (green light fluxes LG1 and LG2).

That is, the optical waveguide 302G according to the present embodiment includes a primary line 3020G (second primary line), which extends from the entrance section 3021G, and a branch line 3020Ga (second-a branch line (third branch line)) and a branch line 3020Gb (second-b branch line (fourth branch line)), which result from the bifurcation of the primary line 3020G at the bifurcation section for distribution 3027G.

Each of the branch lines 3020Ga and 3020Gb includes the bifurcation section for modulation 3022G, the two linear sections for modulation 3023G, the merging section for modulation 3024G, the linkage section 3025G (second-a linkage section (third branch line linkage section) or second-b linkage section (fourth branch line linkage section)), and the exit section 3026G (exit section 3026Ga or exit section 3026Gb), as in the first embodiment. In the optical waveguide 302G shown in FIG. 9, the green light flux LG can therefore be modulated in the branch lines 3020Ga and 3020Gb independently of each other. In FIG. 9, only the positions of the modulation sections 300G (second-a modulation section (third branch line modulation section) and second-b modulation section (fourth branch line modulation section)) are shown, but the electrode 303G is omitted to avoid complexity of the figure.

Similarly, in the present embodiment, a bifurcation section for distribution 3027R (third bifurcation section) is provided between the entrance section 3021R and the bifurcation sections for modulation 3022R of the optical waveguide 302R, as shown in FIG. 9. The optical waveguide 302R therefore bifurcates into two in the immediate vicinity of the entrance section 3021R. As a result, the red light flux LR that enters the optical waveguide 302R is distributed to two optical waveguides at the bifurcation section for distribution 3027R and eventually exits in the form of two light fluxes (red light fluxes LR1 and LR2).

That is, the optical waveguide 302R according to the present embodiment includes a primary line 3020R (third primary line), which extends from the entrance section 3021R, and a branch line 3020Ra (third-a branch line) and a branch line 3020Rb (third-b branch line), which result from the bifurcation of the primary line 3020R at the bifurcation section for distribution 3027R.

Each of the branch lines 3020Ra and 3020Rb includes the bifurcation section for modulation 3022R, the two linear sections for modulation 3023R, the merging section for modulation 3024R, the linkage section 3025R (third-a linkage section or third-b linkage section), and the exit section 3026R (exit section 3026Ra or exit section 3026Rb), as in the first embodiment. In the optical waveguide 302R shown in FIG. 9, the red light flux LR can therefore be modulated in the branch lines 3020Ra and 3020Rb independently of each other. In FIG. 9, only the positions of the modulation section 300R (third-a modulation section and third-b modulation section) are shown, but the electrode 303G is omitted to avoid complexity of the figure.

Figure 10:
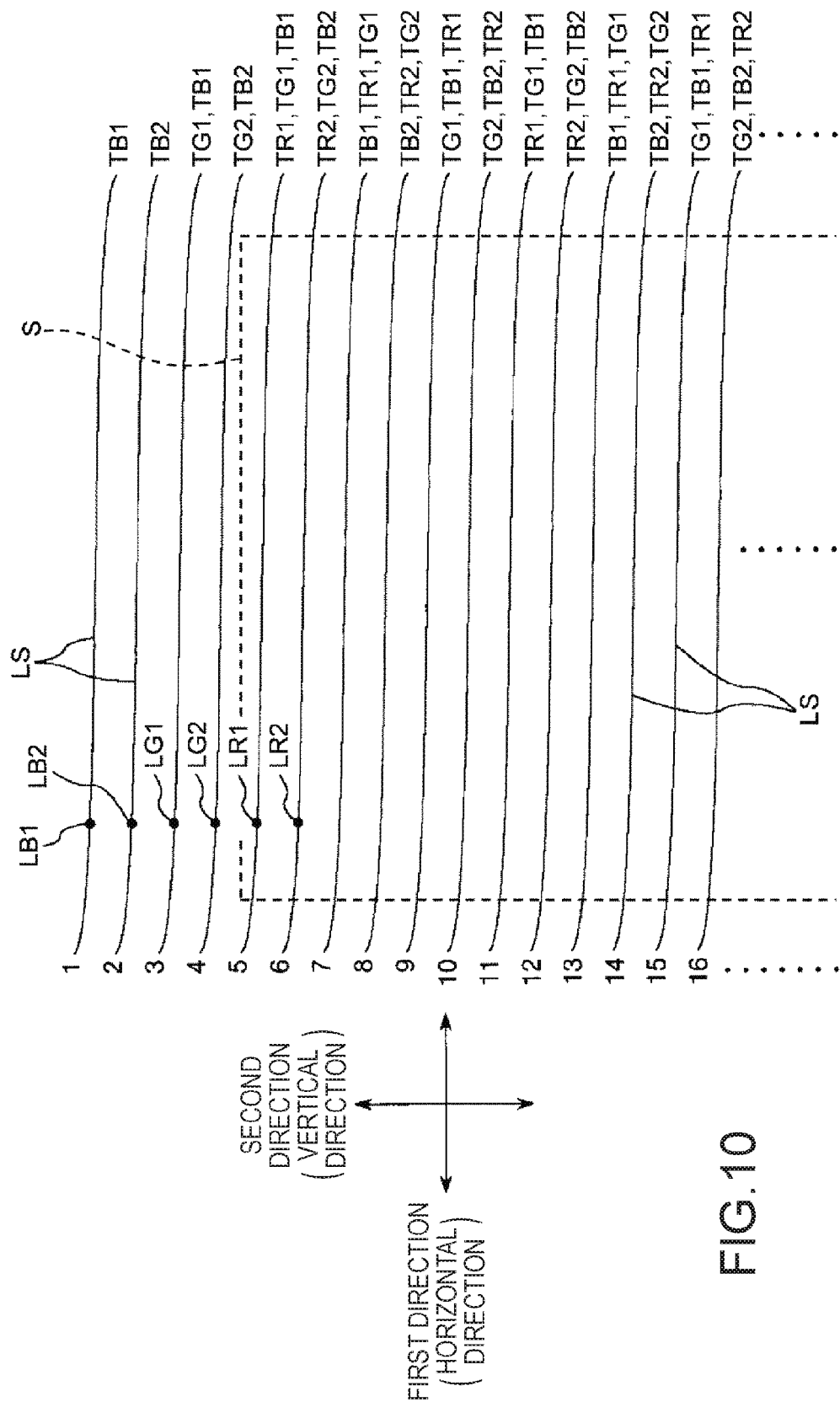
FIG. 10 shows the trajectories of swept signal light fluxes in an image formation plane according to a second embodiment.

FIG. 10 shows sweep trajectories TR1, TR2, TG1, TG2, TB1, and TB2 of the signal light fluxes (red light flux LR1, red light flux LR2, green light flux LG1, green light flux LG2, blue light flux LB1, and blue light flux LB2) in the image formation plane according to the present embodiment.

In the present embodiment, the point irradiated with the blue light flux LB1, the point irradiated with the blue light flux LB2, the point irradiated with the green light flux LG1, the point irradiated with the green light flux LG2, the point irradiated with the red light flux LR1, and the point irradiated with the red light flux LR2 at a certain point of time are arranged side by side in the second direction, as shown in the form of six points in FIG. 10, and swept in the first and second directions with the positional relationship maintained. The following trajectories are therefore formed: the sweep trajectory TB1 of the blue light flux LB1; the sweep trajectory TB2 of the blue light flux LB2; the sweep trajectory TG1 of the green light flux LG1; the sweep trajectory TG2 of the green light flux LG2; the sweep trajectory TR1 of the red light flux LR1; and the sweep trajectory TR2 of the red light flux LR2.

The sweep trajectories are formed as follows: The sweep trajectory TB1 is formed on the sweep line LS1; the sweep trajectory TB2 is formed on the sweep line LS2; the sweep trajectory TG1 is formed on the sweep line LS3; the sweep trajectory TG2 is formed on the sweep line LS4; the sweep trajectory TR1 is formed on the sweep line LS5; and the sweep trajectory TR2 is formed on the sweep line LS6. The sweeping operation described above is called first sweeping.

Thereafter, the points irradiated with the red light flux LR1, the red light flux LR2, the green light flux LG1, the green light flux LG2, the blue light flux LB1, and the blue light flux LB2 are shifted in the second direction (downward in FIG. 10), and then second sweeping is performed. In this process, shifting the sweep trajectories by two sweep lines LS allows formation of the sweep trajectory TG1 on the sweep trajectory TR1 formed in the first sweeping and formation of the sweep trajectory TG2 on the sweep trajectory TR2 formed in the first sweeping. As a result, the sweep trajectory TR1 and the sweep trajectory TG1 are superimposed on each other on the sweep line LS5, and a color resulting from the combination of the red light flux LR1 and the green light flux LG1 is produced. On the sweep line LS6, the sweep trajectory TR2 and the sweep trajectory TG2 are superimposed on each other, and a color resulting from the combination of the red light flux LR2 and the green light flux LG2 is produced.

Thereafter, the points irradiated with the red light flux LR1, the red light flux LR2, the green light flux LG1, the green light flux LG2, the blue light flux LB1, and the blue light flux LB2 are further shifted in the second direction (downward in FIG. 10), and then third sweeping is performed. In this process, shifting the sweep trajectories by two sweep lines LS allows the sweep trajectory TB1 in the third sweeping to be superimposed, in addition to the sweep trajectory TR1 in the first sweeping and the sweep trajectory TG1 in the second sweeping, on the sweep line LS 5. As a result, a color resulting from the combination of the red light flux LR1, the green light flux LG1, and the blue light flux LB1 is produced. On the sweep line LS6 is superimposed the sweep trajectory TB2 in the third sweeping in addition to the sweep trajectory TR2 in the first sweeping and the sweep trajectory TG2 in the second sweeping. As a result, a color resulting from the combination of the red light flux LR2, the green light flux LG2, and the blue light flux LB2 is produced.

In FIG. 10, the sweep lines LS are labeled with the reference characters of the sweep trajectories on the right of the sweep lines LS. Further, when sweep trajectories are superimposed on one another on the same sweep line LS, the sweep line LS is labeled with the reference characters of the plurality of sweep trajectories.

Repeating the sweeping operation described above to perform the fourth, fifth, . . . sweeping allows the three color light fluxes to be superimposed on one another on the sweep line LS5 and the following sweep lines LS, whereby an arbitrary color and brightness resulting from a combination of the three primary colors of light can be expressed by causing the color light fluxes to blink independently of one another. Therefore, in the present embodiment, the image display region S, where the viewer visually recognizes an image, may be so set as to contain the sweep line LS5 and the following sweep lines LS. In other words, the region that contains the sweep lines LS1 to LS4 does not allow expression of arbitrary color or brightness and is therefore preferably excluded from the image display region S. In this case, the sweep lines LS1 to LS4 are preferably formed in positions where the viewer is unable to visually recognize the sweep lines LS1 to LS4.

As described above, the two-light-flux drawing allows an increase in the number of sweep lines LS as compared with the one-light-flux drawing without any increase in the frequency at which the light sweeper 42 is driven. Therefore, even in a case where it is difficult to increase the drive frequency due to the structure of the light sweeper 42, a high-resolution image can be readily displayed without being influenced by the structure of the light sweeper 42.

The modulator 30 according to the present embodiment allows the exit gap W1 to be sufficiently narrowed. Therefore, even when there is a region excluded from the image display region S, the area (width) of the region can be sufficiently narrowed.

In the image display apparatus 1 according to the present embodiment, in which the exit gap W1 is narrowed, the point irradiated with the red light flux LR1 and the point irradiated with the red light flux LR2 can be located on sweep lines LS adjacent to each other, but the irradiated points are not necessarily arranged as described above. The point irradiated with the red light flux LR1 and the point irradiated with the red light flux LR2 may instead be located on sweep lines LS that are not adjacent to each other.

In the modulator 30 shown in FIG. 9, the modulation section 300B (first modulation section) is formed of electrodes (not shown) that overlie the four linear sections for modulation 3023B, 3023B, 3023B, 3023B. The length L1 of the modulation section 300B is the length along the y direction from the bifurcation point of each of the bifurcation sections for modulation 3022B to the merging point of the corresponding merging section for modulation 3024B, as in the first embodiment.

The length L2 of the modulation section 300G (second modulation section) and the length L3 of the modulation section 300R (third modulation section) are also defined in the same manner as the length L1 of the modulation section 300B is defined.

The reference line DL1 is an imaginary straight line that is parallel to the longitudinal direction of the modulation section 300B and passes through the center point of the x-direction length of the modulation section 300B. In FIG. 9, the center point of the x-direction length of the modulation section 300B is the middle point of the line segment that connects the two merging sections for modulation 3024B to each other. The center point can be considered as the portion where the modulation section 300B is connected to the linkage sections 3025B.

Similarly, the reference line DL2 is an imaginary straight line that is parallel to the longitudinal direction of the modulation section 300G and passes through the center point of the x-direction length of the modulation section 300G. In FIG. 9, the center point of the x-direction length of the modulation section 300G is the middle point of the line segment that connects the two merging sections for modulation 3024G to each other. The center point can be considered as the portion where the modulation section 300G is connected to the linkage sections 3025G.

Similarly, the reference line DL3 is an imaginary straight line that is parallel to the longitudinal direction of the modulation section 300R and passes through the center point of the x-direct ion length of the modulation section 300R. In FIG. 9, the center point of the x-direction length of the modulation section 300R is the middle point of the line segment that connects the two merging sections for modulation 3024R to each other. The center point can be considered as the portion where the modulation section 300R is connected to the linkage sections 3025R.

Further, S1 is defined as the distance between the reference line DL1 and the exit section 3026B (first exit section). In the present embodiment, since the primary line 3020B of the optical waveguide 302B bifurcates into the two branch lines, the branch line 3020Ba and the branch line 3020Bb, the exit section 3026B includes the exit section 3026Ba (first-a exit section (first branch line exit section)), which is the exit section of the branch line 3020Ba, and the exit section 3026Bb (first-b exit section (second branch line exit section)), which is the exit section of the branch line 3020Bb. The distance S1 between the reference line DL1 and the exit section 3026B in the present embodiment is therefore the minimum distance from the middle point of the line segment that connects the exit section 3026Ba and the exit section 3026Bb to each other to the reference line DL1. In other words, when a reference line CL1 is defined to be the straight line passing through the middle point of the line segment that connects the exit section 3026Ba and the exit section 3026Bb to each other and parallel to the reference line DL1, the distance S1 corresponds to the distance between the reference line DL1 and the reference line CL1.

Similarly, S2 is defined as the distance between the reference line DL2 and the exit section 3026G (second exit section). In the present embodiment, since the primary line 3020G of the optical waveguide 302G bifurcates into the two branch lines, the branch line 3020Ga and the branch line 3020Gb, the exit section 3026G includes the exit section 3026Ga (second-a exit section (third branch line exit section)), which is the exit section of the branch line 3020Ga, and the exit section 3026Gb (second-b exit section (fourth branch line exit section)), which is the exit section of the branch line 3020Gb. The distance S2 between the reference line DL2 and the exit section 3026G in the present embodiment is therefore the minimum distance from the middle point of the line segment that connects the exit section 3026Ga and the exit section 3026Gb to each other to the reference line DL2. In other words, when a reference line CL2 is defined to be the straight line passing through the middle point of the line segment that connects the exit section 3026Ga and the exit section 3026Gb to each other and parallel to the reference line DL2, the distance S2 corresponds to the distance between the reference line DL2 and the reference line CL2.

Similarly, S3 is defined as the distance between the reference line DL3 and the exit section 3026R (third exit section). In the present embodiment, since the primary line 3020R of the optical waveguide 302R bifurcates into the two branch lines, the branch line 3020Ra and the branch line 3020Rb, the exit section 3026R includes the exit section 3026Ra (third-a exit section), which is the exit section of the branch line 3020Ra, and the exit section 3026Rb (third-b exit section), which is the exit section of the branch line 3020Rb. The distance S3 between the reference line DL3 and the exit section 3026R in the present embodiment is therefore the minimum distance from the middle point of the line segment that connects the exit section 3026Ra and the exit section 3026Rb to each other to the reference line DL3. In other words, when a reference line CL3 is defined to be the straight line passing through the middle point of the line segment that connects the exit section 3026Ra and the exit section 3026Rb to each other and parallel to the reference line DL3, the distance S3 corresponds to the distance between the reference line DL3 and the reference line CL3.

Under the definitions described above, the modulator 30 according to the present embodiment also satisfies the relationships $L1<L2<L3$ and $S1>S2>S3$.

The second embodiment described above also provides the same advantageous effects as those provided by the first embodiment described above. Further, in the present embodiment, since the number of sweep lines LS can be increased without any increase in the frequency at which the light sweeper 42 is driven, as described above, the resolution of a displayed image can be increased without complication of the structure and control of the light sweeper 42.

Further, in the present embodiment, each of the optical waveguides 302B, 302G, and 302R includes the primary line and the two branch lines, but all the optical waveguides do not necessarily bifurcate, and part or entirety of the optical waveguides may include a primary line and three or more branch lines. In the case where each optical waveguide includes three or more branch lines, a light detection section may be provided in a branch line that is not used by the modulation section. In this case, for example, information on the amount of light detected by the light detection section may be fed back to the control section 33 and reflected in the control of the drive operation of the light source section 311.

Third Embodiment

An image display apparatus according to a third embodiment will next be described.

Figure 11:
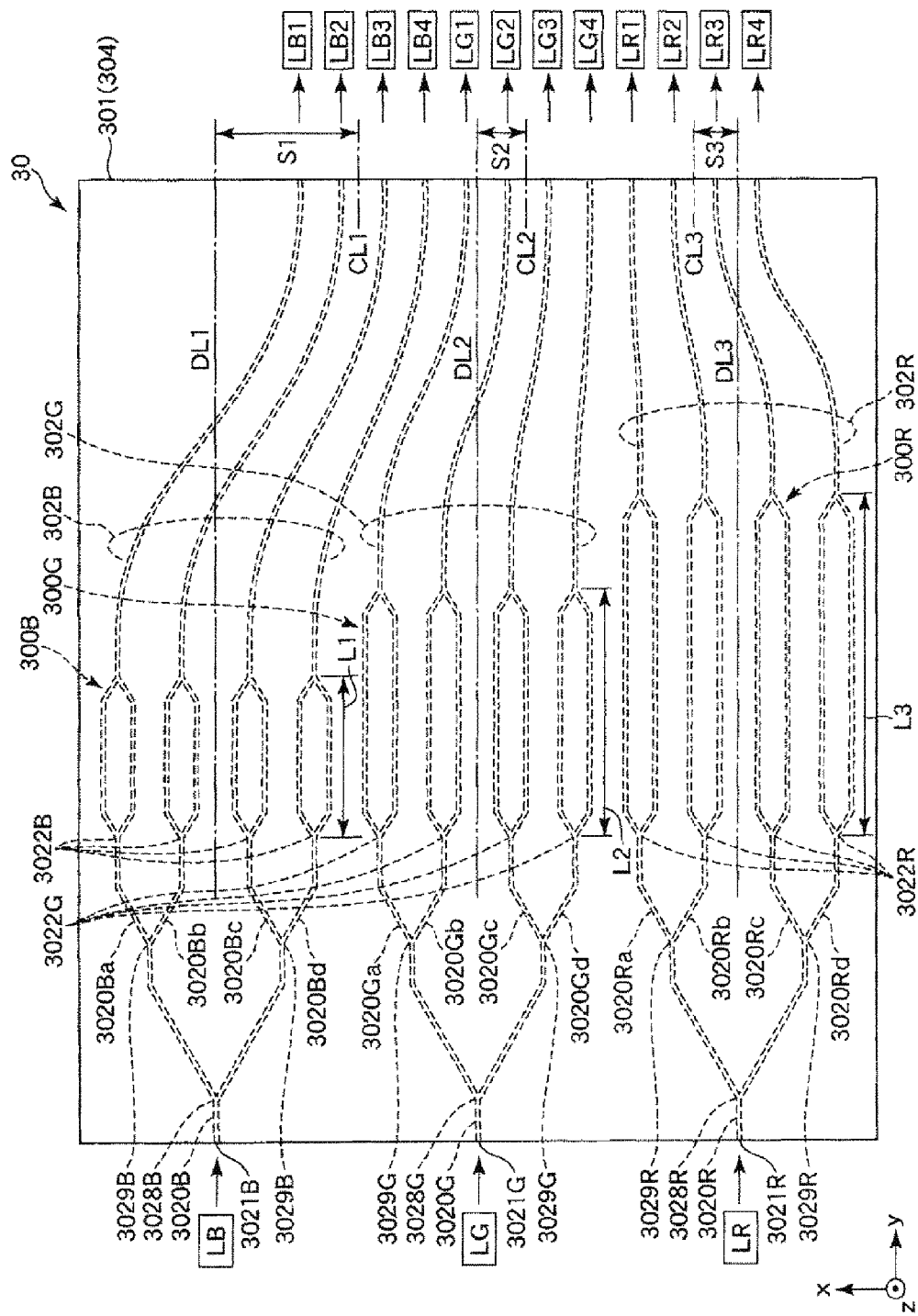
FIG. 11 is a plan view showing a schematic configuration of a modulator provided in an image display apparatus according to a third embodiment.

FIG. 11 is a plan view showing a schematic configuration of a modulator provided in the image display apparatus according to the third embodiment.

The third embodiment will be described below. In the following description, differences from the first and second embodiments described above will primarily be described, and description of the same items will be omitted. Further, in FIG. 11, the same items as those in the embodiments described above have the same reference characters.

In a modulator 30 according to the third embodiment, a bifurcation section for primary distribution 3028B and bifurcation sections for secondary distribution 3029B are provided in this order from the side facing the entrance section 3021B and between the entrance section 3021B and the bifurcation sections for modulation 3022B of the optical waveguide 302B, as shown in FIG. 11. Specifically, the primary line 3020B (first primary line) of the optical waveguide 302B bifurcates into two primary branch lines at the bifurcation section for primary distribution 3028B, and each of the primary branch lines further bifurcates into two secondary branch lines at the corresponding bifurcation section for secondary distribution 3029B. The optical waveguide 302B therefore includes four secondary branch lines in total (branch line 3020Ba (first-a branch line (first branch line)), branch line 3020Bb (first-b branch line (second branch line)), branch line 3020Bc (first-c branch line), and branch line 3020Bd (first-d branch line)). As a result, the blue light flux LB that enters the optical waveguide 302B is distributed to four optical waveguides and eventually exits in the form of four light fluxes (blue light fluxes LB1, LB2, LB3, and LB4).

Each of the four secondary branch lines (branch lines 3020Ba, 3020Bb, 3020Bc, and 3020Bd) includes the bifurcation section for modulation 3022B, the two linear sections for modulation 3023B, the merging section for modulation 3024B, the linkage section 3025B, and the exit section 3026B, as in the first and second embodiments. In FIG. 11, only the positons of the entrance section 3021B, the bifurcation sections for modulation 3022B, and the modulation section 300B are shown, but the other sections provided in the optical waveguide 302B or the electrode 303B is omitted to avoid complexity of the figure.

Similarly, in the present embodiment, a bifurcation section for primary distribution 3028G and bifurcation sections for secondary distribution 3029G are provided in this order from the side facing the entrance section 3021G and between the entrance section 3021G and the bifurcation sections modulation section 3022G of the optical waveguide 302G. Specifically, the optical waveguide 302G bifurcates into two primary branch lines at the bifurcation section for primary distribution 3028G, and each of the primary branch lines further bifurcates into two secondary branch lines at the corresponding bifurcation section for secondary distribution 3029G. The optical waveguide 302G therefore bifurcates into four secondary branch lines in total (branch line 3020Ga (second-a branch line (third branch line)), branch line 3020Gb (second-b branch line (fourth branch line)), branch line 3020Gc (second-c branch line), and branch line 3020Gd (second-d branch line)). As a result, the green light flux LG that enters the optical waveguide 302G is distributed to four optical waveguides and eventually exits in the form of four light fluxes (green light fluxes LG1, LG2, LG3, and LG4).

Each of the four secondary branch lines (branch lines 3020Ga, 3020Gb, 3020Gc, and 3020Gd) includes the bifurcation section for modulation 3022G, the two linear sections for modulation 3023G, the merging section for modulation 3024G, the linkage section 3025G, and the exit section 3026G, as in the first and second embodiments. In FIG. 11, only the positons of the entrance section 3021G, the bifurcation sections for modulation 3022G, and the modulation section 300G are shown, but the other sections provided in the optical waveguide 302G or the electrode 303G is omitted to avoid complexity of the figure.

Similarly, in the present embodiment, a bifurcation section for primary distribution 3028R and bifurcation sections for secondary distribution 3029R are provided in this order from the side facing the entrance section 3021R and between the entrance section 3021R and the bifurcation sections for modulation 3022R of the optical waveguide 302R. Specifically, the optical waveguide 302R bifurcates into two primary branch lines at the bifurcation section for primary distribution 3028R, and each of the primary branch lines further bifurcates into two secondary branch lines at the corresponding bifurcation section for secondary distribution 3029R. The optical waveguide 302R therefore bifurcates into four secondary branch lines in total (branch line 3020Ra (third-a branch line), branch line 3020Rb (third-b branch line), branch line 3020Rc (third-c branch line), and branch line 3020Rd (third-d branch line)). As a result, the red light flux LR that enters the optical waveguide 302R is distributed to four optical waveguides and eventually exits in the form of four light fluxes (red light fluxes LR1, LR2, LR3, and LR4).

Each of the four secondary branch lines (branch lines 3020Ra, 3020Rb, 3020Rc, and 3020Rd) includes the bifurcation section for modulation 3022R, the two linear sections for modulation 3023R, the merging section for modulation 3024R, the linkage section 3025R, and the exit section 3026R, as in the first and second embodiments. In FIG. 11, only the positons of the entrance section 3021R, the bifurcation sections for modulation 3022R, and the modulation section 300R are shown, but the other sections provided in the optical waveguide 302R or the electrode 303R is omitted to avoid complexity of the figure.

As described above, four-light-flux drawing allows an increase in the number of sweep lines LS as compared with the one- or two-light-flux drawing without any increase in the frequency at which the light sweeper 42 is driven. Therefore, even in a case where it is difficult to increase the drive frequency due to the structure of the light sweeper 42, a high-resolution image can be displayed without being influenced by the structure of the light sweeper 42.

The modulator 30 according to the present embodiment allows the exit gap W1 to be sufficiently narrowed. Therefore, even when there is a region excluded from the image display region S, the area (width) of the region can be sufficiently narrowed.

The length L1 of the modulation section 300B, the length L2 of the modulation section 300G, and the length L3 of the modulation section 300R according to the present embodiment are also defined in the same manner as in the first and second embodiments.

The reference lines DL1, DL2, and DL3 and the reference lines CL1, CL2, and CL3 are also defined as in the second embodiment.

Further, the distance S1 between the reference line DL1 and the exit section 3026B (first exit section), the distance S2 between the reference line DL2 and the exit section 3026G, and the distance S3 between the reference line DL3 and the exit section 3026R are also defined as in the second embodiment.

Under the definitions described above, the modulator 30 according to the present embodiment also satisfies the relationships L1<L2<L3 and S1>S2>S3.

The third embodiment described above also provides the same advantageous effects as those provided by the first and second embodiments described above. Further, in the present embodiment, since the number of sweep lines LS can be further increased without any increase in the frequency at which the light sweeper 42 is driven, as described above, the resolution of a displayed image can be further increased without complication of the structure and control of the light sweeper 42.

The number of distributed signal light fluxes is not limited to two in the second embodiment or four in the third embodiment and may be three or five or greater. The greater the number of distributed signal light fluxes, the lower the amount of distributed signal light fluxes, but the number of sweep lines LS can be further increased without any increase in the frequency at which the light sweeper 42 is driven.

Fourth Embodiment

An image display apparatus according to a fourth embodiment will next be described.

Figure 12:
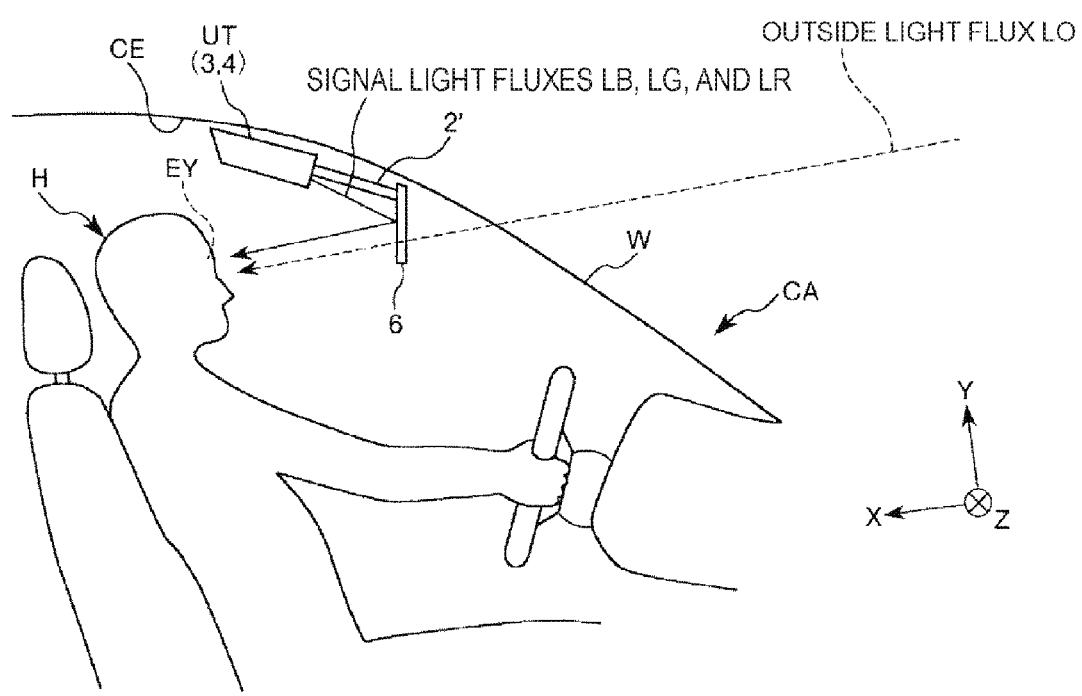
FIG. 12 shows a schematic configuration of an image display apparatus according to a fourth embodiment (head-up display).

FIG. 12 shows a schematic configuration of the image display apparatus according to the fourth embodiment (head-up display).

The fourth embodiment will be described below. In the following description, differences from the first to third embodiments described above will primarily be described, and description of the same items will be omitted. Further, in FIG. 12, the same configurations as those in the embodiments described above have the same reference characters.

An image display apparatus 1 according to the fourth embodiment is the same as the image display apparatus 1 according to the first to third embodiments except that it is not attached to the user's head but is attached to a ceiling section of a car for use.

That is, the image display apparatus 1 according to the fourth embodiment is attached to a ceiling section CE of a car CA for use. That is, the image display apparatus 1 according to the present embodiment is used in a state in which it is disposed vertically above the user's head. The image display apparatus 1 allows the user to visually recognize an image in the form of a virtual image superimposed on an outside image through a windshield W of the car CA.

The image display apparatus 1 includes a light source unit UT, which accommodates the signal generator 3 and the swept light output section 4, the reflector 6, and a frame 2', which connects the light source unit UT to the reflector 6, as shown in FIG. 12.

The present embodiment will be described with reference to a case where the light source unit UT, the frame 2', and the reflector 6 are attached to the ceiling section CE of the car CA. Instead, these components may be attached onto the dashboard of the car CA, or part of the components may be fixed to the windshield W. Further, the image display apparatus 1 may be attached to an airplane, a ship, a construction machine, a heavy machine, a motorcycle, a bicycle, a spaceship, and a variety of other moving objects as well as a car.

Each section of the image display apparatus 1 will be sequentially described below in detail.

The light source unit UT may be fixed to the ceiling section CE in any manner and is, for example, fixed to a sun visor by using a band, a clip, or any other fastener.

The frame 2' includes, for example, a pair of elongated members that connect the light source unit UT to Z-axis-direction opposite ends of the reflector 6 to fix the light source unit UT to the reflector 6.

The light source unit UT accommodates the signal generator 3 and the swept light output section 4, and the swept light output section 4 outputs the signal light fluxes LB, LG, and LR toward the reflector 6.

The reflector 6 according to the present embodiment is also a half-silvered mirror and has the function of transmitting an outside light flux LO. That is, the reflector 6 has a function of reflecting the signal light fluxes LB, LG, and LR (video light fluxes) from the light source unit UT and transmitting the outside light flux LO coming from the space outside the car CA and passing through the windshield W toward the user's eyes EY when the image display apparatus 1 is in use. The function allows the user to visually recognize a virtual image (image) formed by the signal light fluxes LB, LG, and LR while visually recognizing an outside image. That is, a see-through-type head-up display can be achieved.

The thus configured image display apparatus 1 also includes the signal generator 3 according to the first embodiment, as described above. The image display apparatus 1, although it has a simple structure, can provide the same advantageous function and effects as those provided by the first embodiment. That is, a high-resolution image display apparatus 1 can be provided.

The light modulator, the optical module, and the image display apparatus have been described with reference to the illustrated embodiments, but the light modulator, the optical module, and the image display apparatus are not limited thereto.

For example, in the light modulator, the optical module, and the image display apparatus, the configuration of each portion can be replaced with an arbitrary configuration that provides the same function, and an arbitrary configuration can even be added.

The reflector may include a flat reflection surface.

The image display apparatus is not necessarily embodied in the form of the head mounted display or the head-up display described above and can be embodied in any form having the retina sweeping display principle.

The entire disclosure of Japanese Patent Application No. 2015-164089, filed Aug. 21, 2015 is expressly incorporated by reference herein.

What is claimed is:

1. A light modulator comprising
a substrate providing an electro-optical effect,
wherein the substrate is provided with a first optical waveguide that a first light flux enters and a second optical waveguide that a second light flux having a wavelength longer than a wavelength of the first light flux enters,
the first optical waveguide includes
a first modulation section that modulates intensity of the first light flux,
a first exit section that allows the first light flux to exit out of the first optical waveguide, and
a first linkage section that links the first modulation section with the first exit section,
the second optical waveguide includes
a second modulation section that modulates intensity of the second light flux,
a second exit section that allows the second light flux to exit out of the second optical waveguide, and
a second linkage section that links the second modulation section with the second exit section, and
L1<L2 and S1>S2 are satisfied,
where L1 represents a length of the first modulation section in a longitudinal direction thereof,
an imaginary straight line parallel to the longitudinal direction of the first modulation section and passing through a portion where the first modulation section is connected to the first linkage section is defined as a first line, and S1 represents a distance between the first line and the first exit section,
L2 represents a length of the second modulation section in a direction parallel to the first line, and
an imaginary straight line parallel to the first line and passing through a portion where the second modulation section is connected to the second linkage section is defined as a second line, and S2 represents a distance between the second line and the second exit section.

2. The light modulator according to claim 1,
wherein the substrate includes a third optical waveguide that a third light flux having a wavelength longer than the wavelength of the second light flux enters, and
the optical waveguides are provided in an order of the first optical waveguide, the second optical waveguide, and the third optical waveguide.

3. The light modulator according to claim 2,
wherein the third optical waveguide includes
a third modulation section that modulates intensity of the third light flux,
a third exit section that allows the third light flux to exit out of the third optical waveguide, and
a third linkage section that links the third modulation section with the third exit section, and
L1<L2<L3 and S1>S2>S3 are satisfied,
where L3 represents a length of the third modulation section in the direction parallel to the first line, and
an imaginary straight line parallel to the first line and passing through a portion where the third modulation section is connected to the third linkage section is defined as a third line, and S3 represents a distance between the third line and the third exit section.

4. The light modulator according to claim 3,
wherein in a plan view in a thickness direction of the substrate,
the first exit section is located in a position shifted from the first line toward the third line,
the second exit section is located in a position shifted from the second line toward the third line, and
the third exit section is located in a position shifted from the third line toward the first line.

5. An image display apparatus comprising:
a light source section that outputs the first light flux and the second light flux;
the light modulator according to claim 3; and
a light scanner that spatially sweeps the first light flux and the second light flux modulated by the light modulator.

6. The image display apparatus according to claim 5, wherein the image display apparatus is a head mounted display attached to a user's head.

7. The image display apparatus according to claim 5, wherein the image display apparatus is a head-up display.

8. An optical module comprising:
a light source section that outputs the first light flux and the second light flux; and
the light modulator according to claim 2.

9. An image display apparatus comprising:
a light source section that outputs the first light flux and the second light flux;
the light modulator according to claim 2; and
a light scanner that spatially sweeps the first light flux and the second light flux modulated by the light modulator.

10. The image display apparatus according to claim 9, wherein the image display apparatus is a head mounted display attached to a user's head.

11. The image display apparatus according to claim 9, wherein the image display apparatus is a head-up display.

12. The light modulator according to claim 1,
wherein when a portion of the first optical waveguide where the first light flux enters the first optical waveguide is defined as a first entrance section, and
a portion of the second optical waveguide where the second light flux enters the second optical waveguide is defined as a second entrance section,
a distance between the first exit section and the second exit section is smaller than a distance between the first entrance section and the second entrance section.

13. The light modulator according to claim 1,
wherein an optical axis of the light flux that exits through the first exit section is parallel to an optical axis of the light flux that exits through the second exit section.

14. The light modulator according to claim 1,
wherein the first optical waveguide includes a first primary line and a first bifurcation section that bifurcates the first primary line into at least two branch lines, a first branch line and a second branch line,
the first modulation section includes a first branch line modulation section that modulates the intensity of the first light flux passing through the first branch line and a second branch line modulation section that modulates the intensity of the first light flux passing through the second branch line,
the first exit section includes a first branch line exit section that allows the first light flux passing through the first branch line to exit out of the first branch line and a second branch line exit section that allows the first light flux passing through the second branch line to exit out of the second branch line, and
the first linkage section includes a first branch line linkage section that links the first branch line modulation section with the first branch line exit section and a second branch line linkage section that links the second branch line modulation section with the second branch line exit section.

15. The light modulator according to claim 1,
wherein the second optical waveguide includes a second primary line and a second bifurcation section that bifurcates the second primary line into at least two branch lines, a third branch line and a fourth branch line,
the second modulation section includes a third branch line modulation section that modulates the intensity of the second light flux passing through the third branch line and a fourth branch line modulation section that modulates the intensity of the second light flux passing through the fourth branch line,
the second exit section includes a third branch line exit section that allows the second light flux passing through the third branch line to exit out of the third branch line and a fourth branch line exit section that allows the second light flux passing through the fourth branch line to exit out of the fourth branch line, and
the second linkage section includes a third branch line linkage section that links the third branch line modulation section with the third branch line exit section and a fourth branch line linkage section that links the fourth branch line modulation section with the fourth branch line exit section.

16. The light modulator according to claim 1, wherein the first modulation section uses a Mach-Zehnder-type modulation method.

17. An optical module comprising:
a light source section that outputs the first light flux and the second light flux; and
the light modulator according to claim 1.

18. An image display apparatus comprising:
a light source section that outputs the first light flux and the second light flux;
the light modulator according to claim 1; and
a light scanner that spatially sweeps the first light flux and the second light flux modulated by the light modulator.

19. The image display apparatus according to claim 18, wherein the image display apparatus is a head mounted display attached to a user's head.

20. The image display apparatus according to claim 18, wherein the image display apparatus is a head-up display.

* * * * *